(12) United States Patent
Dharur et al.

(10) Patent No.: US 10,937,169 B2
(45) Date of Patent: Mar. 2, 2021

(54) MOTION-ASSISTED IMAGE SEGMENTATION AND OBJECT DETECTION

(71) Applicant: QUALCOMM Incorporated, San Diego, CA (US)

(72) Inventors: Sameer Dharur, Hyderabad (IN); Vishal Jain, Hyderabad (IN); Rashi Tyagi, Hyderabad (IN); Harpal Singh Dhoat, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 16/224,650

(22) Filed: Dec. 18, 2018

(65) Prior Publication Data

US 2020/0193609 A1    Jun. 18, 2020

(51) Int. Cl.
| | |
|---|---|
| *G06K 9/34* | (2006.01) |
| *G06T 7/143* | (2017.01) |
| *G06T 7/11* | (2017.01) |
| *G06N 3/08* | (2006.01) |
| *G06N 3/04* | (2006.01) |

(52) U.S. Cl.
CPC ........... *G06T 7/143* (2017.01); *G06N 3/0472* (2013.01); *G06N 3/084* (2013.01); *G06T 7/11* (2017.01); *G06T 2207/20081* (2013.01); *G06T 2207/20084* (2013.01); *G06T 2210/12* (2013.01)

(58) Field of Classification Search
None
See application file for complete search history.

(56) References Cited

U.S. PATENT DOCUMENTS

| | | | | | |
|---|---|---|---|---|---|
| 5,710,830 | A  | * | 1/1998 | Holeva | F24C 7/06 358/464 |
| 6,298,145 | B1 | * | 10/2001 | Zhang | G06K 9/00228 348/169 |
| 7,783,118 | B2 | * | 8/2010 | Zhou | G06T 7/11 382/236 |
| 8,112,719 | B2 | * | 2/2012 | Hsu | G06F 3/017 715/810 |
| 8,285,045 | B2 | * | 10/2012 | Kim | G06K 9/38 382/173 |
| 8,300,892 | B2 | * | 10/2012 | Iwasaki | G06T 7/292 382/103 |
| 8,340,357 | B2 | * | 12/2012 | Iwasaki | G06T 7/215 382/107 |
| 8,594,199 | B2 | * | 11/2013 | Rossignol | H04N 19/50 375/240.16 |

(Continued)

*Primary Examiner* — Feng Niu
(74) *Attorney, Agent, or Firm* — QUALCOMM Incorporated

(57) ABSTRACT

Techniques and systems are provided for segmenting one or more frames. For example, image segmentation can be performed on a first frame of a plurality of frames. The image segmentation results in generation of a segmentation mask. Pixels of the first frame can be modified using the segmentation mask. An amount of movement of one or more pixels of a second frame can be determined. The amount of movement can be determined based on one or more motion characteristics of the second frame. It can be determined whether to perform image segmentation using the second frame or a third frame of the plurality of frames based on the amount of movement of the one or more pixels of the second frame.

28 Claims, 15 Drawing Sheets

(56) References Cited

U.S. PATENT DOCUMENTS

| | | | | |
|---|---|---|---|---|
| 8,605,945 B2* | 12/2013 | El-Maleh | ............... | G06T 7/174 |
| | | | | 382/103 |
| 9,171,372 B2* | 10/2015 | Zhang | ................... | G06T 7/579 |
| 9,454,819 B1* | 9/2016 | Seetharaman | ....... | G06K 9/6277 |
| 9,584,814 B2* | 2/2017 | Socek | ..................... | G06T 7/11 |
| 9,865,062 B2* | 1/2018 | Sundaresan | ............... | G06T 7/11 |
| 10,269,121 B2* | 4/2019 | Socek | ..................... | G06T 7/215 |
| 10,552,962 B2* | 2/2020 | Socek | ..................... | G06T 7/11 |
| 2008/0095436 A1* | 4/2008 | Kim | ........................ | G06T 7/215 |
| | | | | 382/173 |
| 2011/0194602 A1* | 8/2011 | Andersson | ........... | H04N 19/176 |
| | | | | 375/240.12 |
| 2012/0127267 A1* | 5/2012 | Zhang | ..................... | G06T 7/579 |
| | | | | 348/43 |
| 2012/0189168 A1* | 7/2012 | El-Maleh | ........... | G06K 9/00248 |
| | | | | 382/107 |
| 2016/0127654 A1* | 5/2016 | Kraft | ................... | H04N 5/23229 |
| | | | | 348/239 |
| 2016/0366367 A1* | 12/2016 | Chen | ........................ | G06T 5/003 |
| 2017/0041632 A1* | 2/2017 | Hepper | ................... | G06T 7/207 |
| 2017/0337711 A1* | 11/2017 | Ratner | ................. | H04N 19/176 |
| 2017/0359570 A1* | 12/2017 | Holzer | ................. | H04N 13/282 |
| 2018/0012330 A1* | 1/2018 | Holzer | ................... | G06T 11/60 |
| 2018/0295375 A1* | 10/2018 | Ratner | ................... | G06T 7/136 |
| 2019/0045193 A1* | 2/2019 | Socek | ................... | H04N 19/543 |
| 2019/0340462 A1* | 11/2019 | Pao | ....................... | G06T 3/4053 |

\* cited by examiner

600

PERFORM IIMAGE SEGMENTATION ON A FIRST FRAME OF A PLURALITY OF FRAMES, THE IMAGE SEGMENTATION RESULTING IN GENERATION OF A SEGMENTATION MASK
602

MODIFY PIXELS OF THE FIRST FRAME USING THE SEGMENTATION MASK
604

DETERMINE AN AMOUNT OF MOVEMENT OF ONE OR MORE PIXELS OF A SECOND FRAME RELATIVE TO A PREVIOUS FRAME, THE AMOUNT OF MOVEMENT BEING DETERMINED BASED ON ONE OR MORE MOTION CHARACTERISTICS OF THE SECOND FRAME
606

DETERMINE THE AMOUNT OF MOVEMENT OF THE ONE OR MORE PIXELS OF THE SECOND FRAME IS ABOVE A MOTION THRESHOLD
608

IN RESPONSE TO DETERMINING THE AMOUNT OF MOVEMENT OF THE ONE OR MORE PIXELS OF THE SECOND FRAME IS ABOVE THE MOTION THRESHOLD, PERFORM IMAGE SEGMENTATION ON A TARGET FRAME, THE IMAGE SEGMENTATION RESULTING IN GENERATION OF AN ADDITIONAL SEGMENTATION MASK
610

MODIFY PIXELS OF THE TARGET FRAME USING THE ADDITIONAL SEGMENTATION MASK
612

FIG. 6

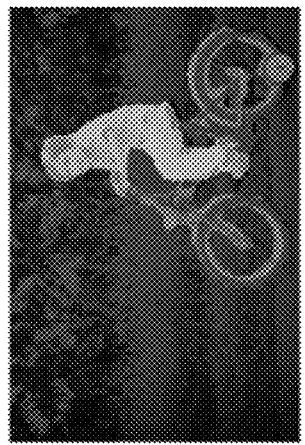
FIG. 7C
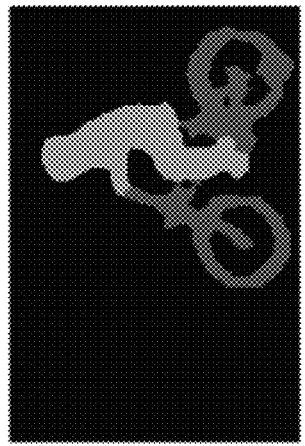
FIG. 7B
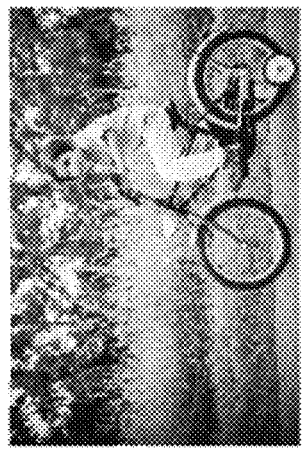
FIG. 7A
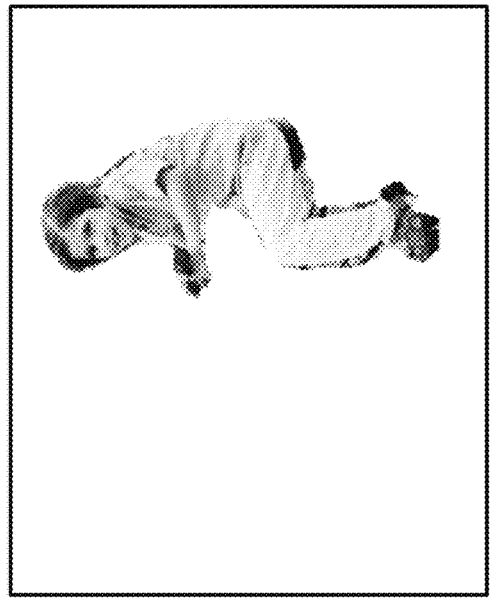
FIG. 7D

Image with GT Boxes 8 x 8 Feature Map loc : $\Delta(cx, cy, w, h)$
conf : $(c_1, c_2, \ldots, c_p)$ 4 x 4 Feature Map

US 10,937,169 B2

MOTION-ASSISTED IMAGE SEGMENTATION AND OBJECT DETECTION

FIELD

Aspects of the present disclosure generally relate to techniques and systems for segmenting images into foreground and background portions, and more specifically to motion-assisted image segmentation. Other aspects of the present disclosure generally relate to techniques and systems for performing object detection, and more specifically to motion-assisted object detection.

BACKGROUND

Many devices and systems allow a scene to be captured by generating image and/or video data of the scene. For example, a camera can be used to capture images of a scene for recreational use, for professional photography, for surveillance, among other applications. The image data from image capture devices and systems can be captured and output for processing and/or consumption.

Object detection in images and videos is a widely used feature in many devices and systems, such as mobile phones, cameras, vehicles (e.g., self-driving cars, unmanned aerial vehicles, and other vehicles), among other devices. Applications that use object detection are also numerous, including, for example, package delivery, object tracking, defense and rescue operations, among others. Effective techniques are needed for accurately and efficiently detecting objects in images and/or video frames.

Images and video frames can also be segmented into foreground and background portions using various techniques. The segmented images and video frames can then be used for various applications. In one illustrative example, visual effects can be added to the images using the segmentation information. For instance, the background portion and/or the foreground portion of the scene in an image can be modified. Effective techniques are needed for accurately and efficiently segmenting images into foreground and background portions in a timely manner.

BRIEF SUMMARY

In some examples, techniques and systems are described for performing motion-assisted image segmentation. The motion-assisted image segmentation can use a motion based trigger to determine when to perform image segmentation for a frame. In some examples, techniques and systems are described for performing motion-assisted object detection. The motion-assisted object detection can use a motion based trigger to determine when to perform object detection for a frame.

In one illustrative example, a motion-assisted image segmentation process can obtain a first frame of a sequence of frames, and can perform image segmentation using the first frame in order to determine a segmentation mask for the frame. A segmentation mask can also be referred to as a segmentation map. In some cases, the image segmentation can include a machine-learning based image segmentation, where a segmentation mask can be generated at each inference of the machine-learning based image segmentation. In some cases, any other type of image segmentation process can be used. In some examples, the segmentation mask indicates which pixels in the frame are foreground pixels corresponding to an object of interest and which pixels are background pixels. In some cases, the segmentation mask can include indications of other pixels (other than foreground and background pixels). Using the segmentation mask, an output frame can then be generated with a modified foreground or background.

For subsequent frames occurring after the first frame in the sequence of frames, instead of again performing image segmentation (e.g., generating a machine learning-based inference), the motion-assisted image segmentation process can determine motion characteristics of the subsequent frames. For example, motion vectors can be computed between a previous frame and a current frame (e.g., between the first frame and a frame 2, between a frame 2 and a frame 3, or the like). In one illustrative example, the motion vectors can be computed using optical flow between frames (e.g., using an optical flow API). The motion characteristics (e.g., motion vectors or other motion information) can be used as a motion based trigger to determine when to perform image segmentation for a frame in order to generate a segmentation mask for the frame. For example, if the motion vectors between a current frame and a previous frame indicate a change in movement (or an amount of movement) between frames that is above a certain motion threshold, image segmentation can be performed on a target frame. The target frame can be the current frame or a next frame occurring after the current frame (e.g., the frame immediately following the current frame or a frame multiple frames after the current frame in the sequence of frames). Otherwise, if the motion vectors do not indicate a change above the motion threshold, the processed previous frame and the motion vectors between the previous and next frame (or the current frame in some cases) can be used to generate the processed version of the next frame (or the current frame). For example, the motion vectors can be used to determine where the pixels in the next frame (or the current frame) should be located relative to the pixels in the previous output frame.

In another illustrative example, a motion-assisted object detection process can obtain a first frame of a sequence of frames. Object detection can be performed on the first frame in order to detect one or more objects in the frame. The object detection can include a machine-learning based object detection process. The object detection process can output bounding regions (e.g., bounding boxes or bounding regions having other shapes) representing the locations of the detected objects. In other cases, other types of object detection processes can be used.

For subsequent frames occurring after the first frame in the sequence of frames, instead of again performing object detection (e.g., generating a machine learning-based inference), the motion-assisted object detection process can determine motion characteristics of the subsequent frames. For example, motion vectors can be computed between a previous and a current frame (e.g., between the first frame and a frame 2, between a frame 2 and a frame 3, or the like). In one illustrative example, the motion vectors can be computed using optical flow between frames (e.g., using an optical flow API). The motion characteristics (e.g., motion vectors or other motion information) can be used as a motion based trigger to determine when to perform object detection for a frame. For example, if the motion vectors between a current frame and a previous frame indicate a change in movement (or an amount of movement) between frames that is above a certain motion threshold, object detection can be performed on a next frame (or in some cases on the current frame). Otherwise, if the motion vectors do not indicate a change above the motion threshold, the processed previous frame and the motion vectors between the previous and next frame (or the current frame in some cases) can be used to generate the processed version of the next frame (or the current frame). For example, the motion vectors can be used to determine where the bounding regions in the next frame (or the current frame) should be located relative to the bounding regions in the previous output frame.

As noted above, the image segmentation process and/or the objection detection process can be machine-learning based processes. For example, a trained deep learning neural network (e.g., a Convolutional Neural Network (CNN) or other deep neural network) can be used for the image segmentation and another trained deep learning neural network can be used for the object detection. Given the complex nature of running each frame through a deep learning neural network, neural network based image segmentation and object detection are power-intensive operations that can use large compute and battery resources, and can also lead to sub-optimal performance. The motion-assisted techniques described above provide an optimization using motion information to circumvent such limitations, and provide crucial gains in latency, power, and performance.

According to at least one example, a method of segmenting one or more frames is provided. The method includes performing image segmentation on a first frame of a plurality of frames. The image segmentation results in generation of a segmentation mask. The method further includes modifying pixels of the first frame using the segmentation mask. The method further includes determining an amount of movement of one or more pixels of a second frame relative to a previous frame. The amount of movement is determined based on one or more motion characteristics of the second frame. The method further includes determining the amount of movement of the one or more pixels of the second frame is above a motion threshold and, in response to determining the amount of movement of the one or more pixels of the second frame is above the motion threshold, performing image segmentation on a target frame. The image segmentation performed on the target frame results in generation of an additional segmentation mask. The method further includes modifying pixels of the target frame using the additional segmentation mask.

In another example, an apparatus for segmenting one or more frames is provided that includes a memory configured to store the plurality of images and a processor coupled to the memory. The processor is configured to and can perform image segmentation on a first frame of a plurality of frames. The image segmentation results in generation of a segmentation mask. The processor is configured to and can modify pixels of the first frame using the segmentation mask. The processor is configured to and can determine an amount of movement of one or more pixels of a second frame relative to a previous frame. The amount of movement is determined based on one or more motion characteristics of the second frame. The processor is configured to and can determine the amount of movement of the one or more pixels of the second frame is above a motion threshold and, in response to determining the amount of movement of the one or more pixels of the second frame is above the motion threshold, perform image segmentation on a target frame. The image segmentation performed on the target frame results in generation of an additional segmentation mask. The processor is configured to and can modify pixels of the target frame using the additional segmentation mask.

In another example, a non-transitory computer-readable medium is provided that has stored thereon instructions that, when executed by one or more processors, cause the one or more processor to: perform image segmentation on a first frame of a plurality of frames, the image segmentation resulting in generation of a segmentation mask; modify pixels of the first frame using the segmentation mask; determine an amount of movement of one or more pixels of a second frame relative to a previous frame, the amount of movement being determined based on one or more motion characteristics of the second frame; determine the amount of movement of the one or more pixels of the second frame is above a motion threshold; in response to determining the amount of movement of the one or more pixels of the second frame is above the motion threshold, perform image segmentation on a target frame, the image segmentation resulting in generation of an additional segmentation mask; and modify pixels of the target frame using the additional segmentation mask.

In another example, an apparatus for segmenting one or more frames is provided. The apparatus includes means for performing image segmentation on a first frame of a plurality of frames. The image segmentation results in generation of a segmentation mask. The apparatus further includes means for modifying pixels of the first frame using the segmentation mask. The apparatus further includes means for determining an amount of movement of one or more pixels of a second frame relative to a previous frame. The amount of movement is determined based on one or more motion characteristics of the second frame. The apparatus further includes means for determining the amount of movement of the one or more pixels of the second frame is above a motion threshold and, in response to determining the amount of movement of the one or more pixels of the second frame is above the motion threshold, means for performing image segmentation on a target frame. The image segmentation performed on the target frame results in generation of an additional segmentation mask. The apparatus further includes means for modifying pixels of the target frame using the additional segmentation mask.

In some aspects, the second frame is a next frame after the first frame in the plurality of frames. In such aspects, the previous frame can be the first frame. In some aspects, the second frame is not a next frame after the first frame in the plurality of frames, and the previous frame is an intervening frame between the first frame and the second frame.

In some aspects, the target frame is the second frame. In some aspects, the target frame is a third frame, the third frame occurring in the plurality of frames after the second frame.

In some aspects, the one or more motion characteristics of the second frame include motion vectors between pixels of the previous frame and pixels of the second frame. The previous frame occurs in the plurality of frames prior to the second frame.

In some aspects, the methods, apparatuses, and computer-readable medium described above further comprise: obtaining a third frame of the plurality of frames; determining an amount of movement of one or more pixels of the third frame relative to a fourth frame, the fourth frame occurring in the plurality of frames prior to the third frame; determining the amount of movement of the one or more pixels of the third frame is below the motion threshold; and in response to determining the amount of movement of the one or more pixels of the third frame is below the motion threshold, determining not to perform image segmentation using the third frame.

In some aspects, the methods, apparatuses, and computer-readable medium described above further comprise, in response to determining not to perform image segmentation using the third frame: determining movement of pixels of the third frame relative to pixels of the fourth frame; and determining locations of the pixels in the third frame based on the movement of the pixels of the third frame relative to the pixels of the fourth frame.

In some aspects, the movement of the pixels of the third frame relative to the pixels of the fourth frame is determined using motion vectors determined between the pixels of the third frame and the pixels of the fourth frame. In some aspects, the locations of the pixels in the third frame are determined using the motion vectors.

In some aspects, the image segmentation is performed using a neural network trained to segment foreground pixels of a frame from background pixels of the frame.

In some aspects, the modified pixels of the first frame include background pixels of the first frame. In some aspects, the modified pixels of the first frame include foreground pixels of the first frame.

In some aspects, the methods, apparatuses, and computer-readable medium described above further comprise displaying an output frame, the output frame including the modified pixels of the second frame.

In some aspects, the apparatus comprises a mobile device. In some examples, the apparatus comprises one or more cameras for capturing the plurality of frames and a display for displaying one or more output frames. For example, the apparatus can include the one or more cameras, the display, or both the camera and the display. In some cases, the apparatus can include multiple cameras for capturing frames. In some cases, the display can display an output frame that includes the modified pixels of the second frame.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 6 is a flowchart illustrating an example of a process for segmenting one or more frames, in accordance with some examples;

FIG. 7A is an example of an image, in accordance with some examples;

FIG. 7B is an example of a segmentation mask generated using the image illustrated in FIG. 7A, in accordance with some examples;

FIG. 7C is an example of a segmentation overlay based on the image illustrated in FIG. 7A and the segmentation mask illustrated in FIG. 7B, in accordance with some examples;

FIG. 7D is an example of the image illustrated in FIG. 7A with the background removed based on the segmentation mask illustrated in FIG. 7B, in accordance with some examples;

DETAILED DESCRIPTION

Figure 1:
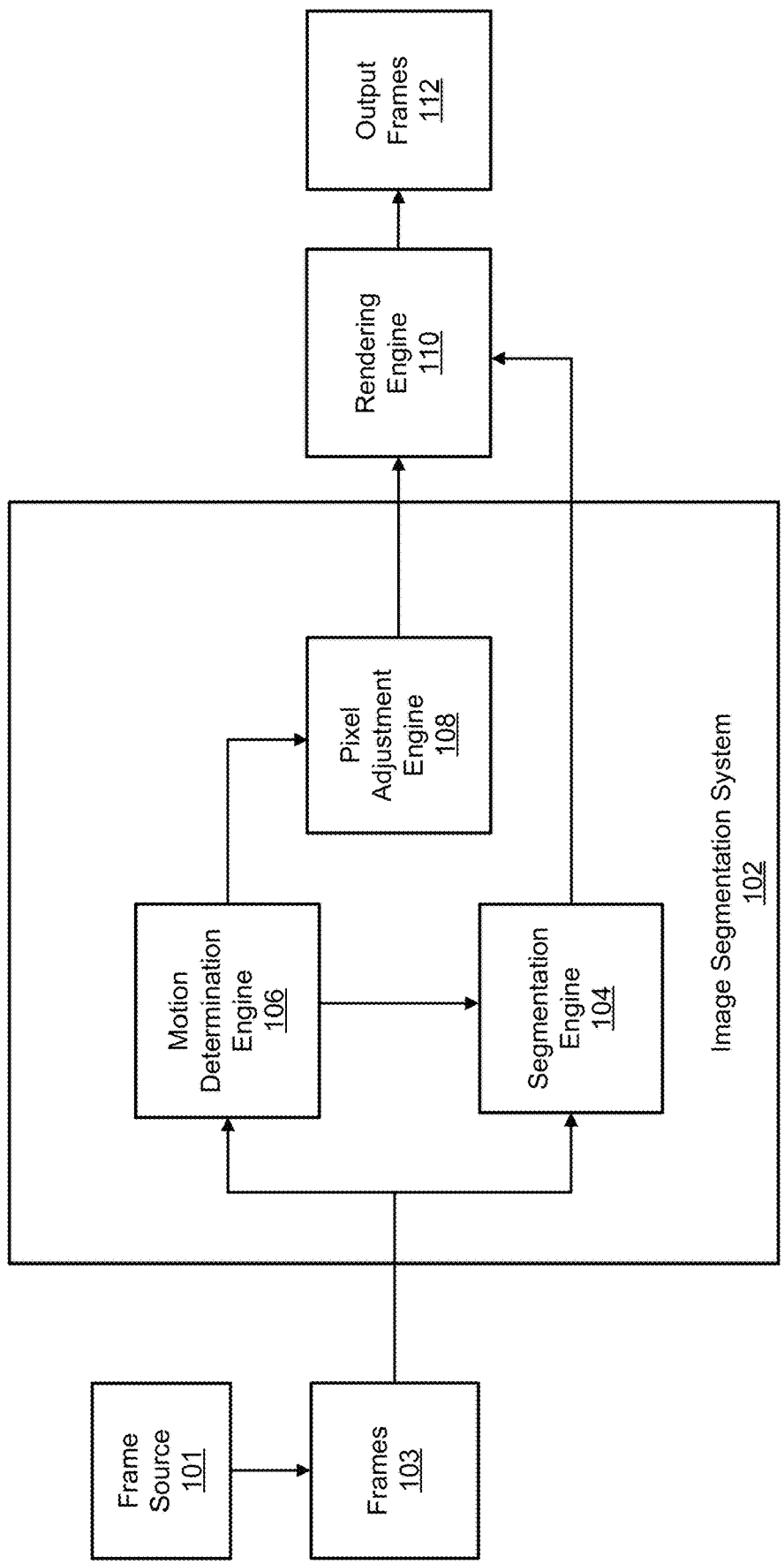
FIG. 1 is a block diagram illustrating an example of an image segmentation system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Images and video frames can also be segmented into foreground and background portions using various techniques. In some cases, depth-mapping techniques can generate and use depth maps to determine which portion of a frame is foreground. For instance, data from a wide angle lens and data from a telephoto lens can be used to generate a depth map. The depth can then be used to manipulate certain objects in the frame. For example, background objects can be artificially blurred depending on how far they are from an in-focus object of interest.

Machine learning can also be used to generate a segmentation mask that indicates which pixels in a frame are foreground pixels and which pixels are background pixels. For example, a deep neural network can be trained by inputting into the neural network many images that have a foreground object of interest and providing a known output for the input images. The input images can be annotated with an indication that a portion in each image is a foreground object of interest. The known output of the neural network can include a segmentation mask. In some examples, the segmentation mask can include a first value for pixels that belong to an object of interest and a second value for pixels that belong to the background. Using machine learning allows for high image segmentation using a single camera, whereas many depth-based techniques require multiple cameras. Visual effects can be added to the frames using the segmentation information.

With the proliferation of more high speed networks (e.g., 4G or LTE networks, the imminent arrival of 5G connectivity) for computing devices (e.g., smartphones, laptops, tablet computers, smart televisions, among others), high bandwidth communications are being used more and more. For example, video-calls have become a common means of communication among friends, family, business clients, and others. In many of these calls, the participants would like to hide or de-emphasize their background in the interest of privacy or to prevent sending unwanted information or context. In another example, a user of a computing devices may prefer to manipulate certain portions of an image of the user. For instance, the background portion and/or the foreground portion of the scene in a frame can be modified.

Systems, methods, and computer-readable media are described herein for performing motion-assisted image segmentation. The motion-assisted image segmentation provides a useful feature (e.g., in the form of an enhanced Computer Vision application) that can be deployed on video or image frames. In some cases, as described in more detail below, the motion-assisted image segmentation can use machine learning to segment a frame, and can use a motion based trigger to run the machine learning. By using the motion based trigger, crucial gains in latency, power, and performance can be achieved. A frame can include a video frame from a video (that includes a sequence of video frames) or a still image from a set of consecutively captured still images.

FIG. 1 is a diagram illustrating an example of an image segmentation system 102. The image segmentation system 102 includes various components, including a segmentation engine 104, a motion determination engine 106, and a pixel adjustment engine 108. A rendering engine 110 is also shown as being in communication with the image segmentation system 102. In some implementations, the rendering engine 110 can be part of the image segmentation system 102. The components of the image segmentation system 102 and the rendering engine 110 can include electronic circuits or other electronic hardware, which can include one or more programmable electronic circuits (e.g., microprocessors, graphics processing units (GPUs), digital signal processors (DSPs), central processing units (CPUs), neural processing engines (NPEs) or neural processing units (NPUs), or other suitable electronic circuits), computer software, firmware, or any combination thereof, to perform the various operations described herein. The segmentation system 102 can leverage the architectures of the CPU, DSP, GPU, and the NPU or NPE to dynamically determine the best means to run a neural network, while optimizing metrics such as latency, throughput, battery, memory, CPU, among others. In one illustrative example, the operations of the segmentation engine 104 can be implemented using a NPE that can run one or more neural networks, a GPU, and/or a DSP. In another example, the operations of the motion determination engine 106 can be implemented using a CPU. In another example, the operations of the rendering engine 110 can be implemented using a GPU. While the image segmentation system 102 is shown to include certain components, one of ordinary skill will appreciate that the image segmentation system 102 can include more or fewer components than those shown in FIG. 1. For example, the image segmentation system 102 may also include, in some instances, one or more memory (e.g., RAM, ROM, cache, buffer, and/or the like) and/or processing devices that are not shown in FIG. 1.

Multiple frames (e.g., frames 103) can be processed by the components of the image segmentation system 102 to provide an adjusted output frame that has a desired visual effect. A frame can include a video frame of a video sequence or a still image of a set of consecutively captured still images. In one illustrative example, a set of consecutively captured still images can be captured and displayed to the user as a preview of what is in the field-of-view of the camera, which can help the user decide when to capture an image for storage. In another illustrative example, a set of consecutively captured still images can be captured using a burst mode or other similar mode that captures multiple consecutive images.

A frame can be a red-green-blue (RGB) frame having red, green, and blue color components per pixel, a luma, chroma-red, chroma-blue (YCbCr) frame having a luma component and two chroma (color) components (chroma-red and chroma-blue) per pixel, or any other suitable type of color or monochrome picture. In some examples, the image segmentation process can be performed in response to one or more image frames being captured by a camera or a computing device that includes a camera (e.g., a mobile device, or the like), where the desired visual effect is selected for application to the captured one or more frames. In one illustrative example, the image segmentation process can be invoked in response to selection of a shutter button, one or more graphical icons that cause a frame to be captured with the visual effect, and/or other selection option of a camera or computing device.

Figure 2:
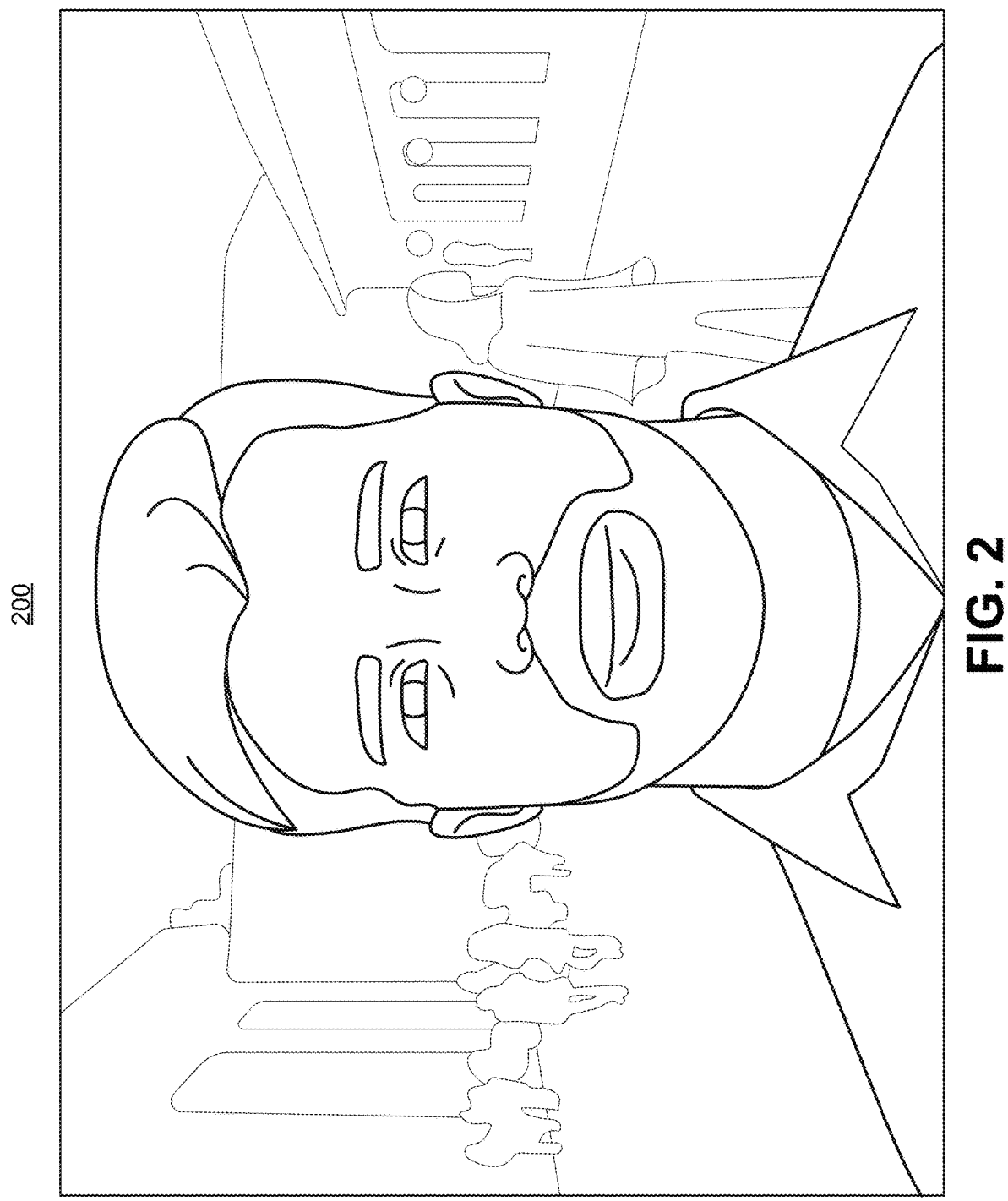
FIG. 2 is a photograph illustrating a frame with a foreground subject and a blurred background, in accordance with some examples.
Figure 3:
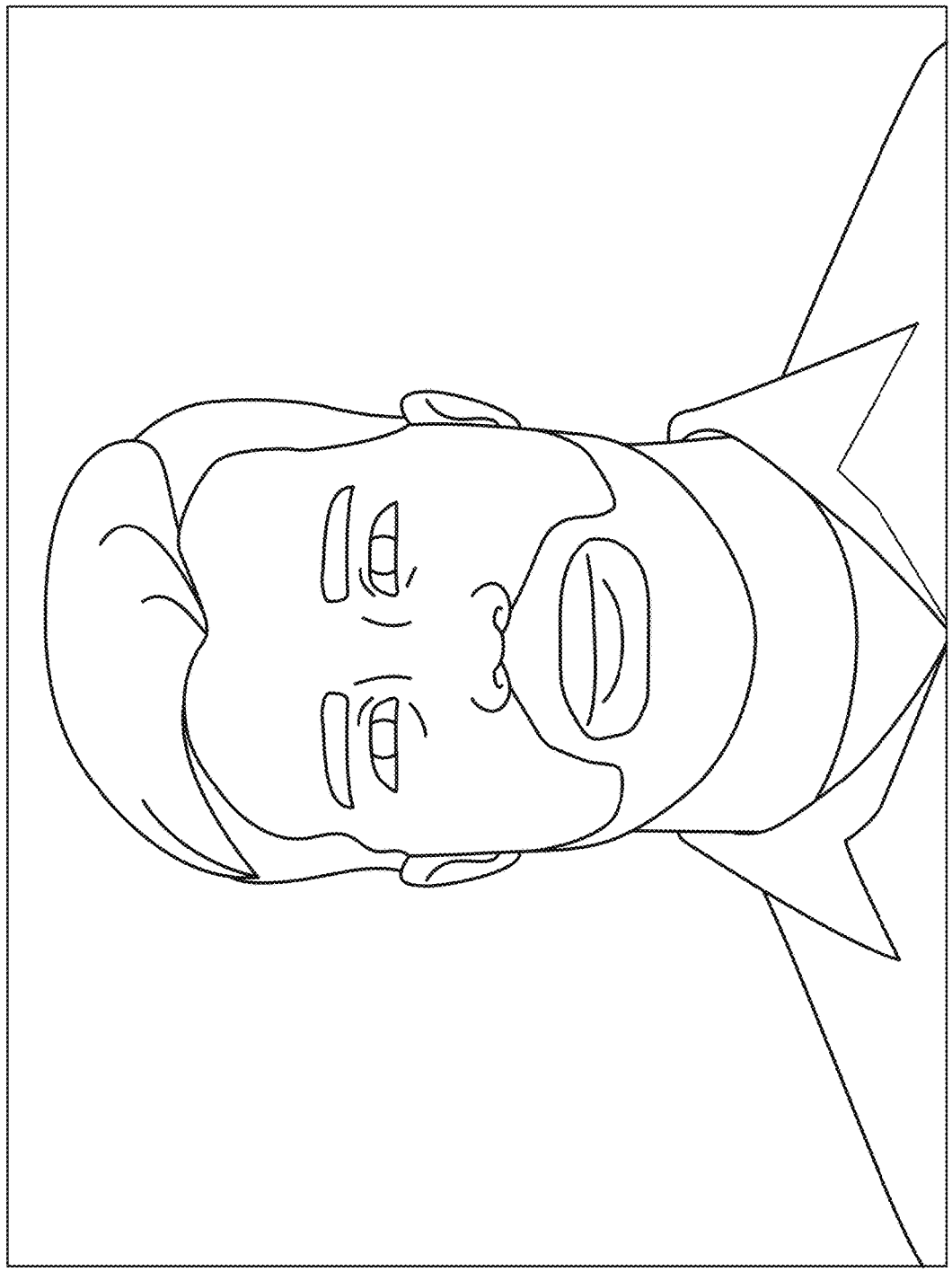
FIG. 3 is a conceptual image illustrating a frame with a foreground subject and a whited-out background, in accordance with some examples.

The visual effect can include the background pixels of the frame being blurred out, being blacked out, being changed to a different color, being replaced with a different background, having an adjusted lighting and/or color characteristic, and/or applied with any other suitable effect. FIG. 2 shows an example of an output frame 200 with a foreground object (a person's face) in focus and the background blurred out. FIG. 3 shows an example of an output frame 300 with a foreground object (a person's face) in focus and the background whited out (all background pixels are set to a white value, such as a value of 0 or a value of 255 on a 0-255 color scale). In another example, the visual effect can include modifying the foreground pixels (e.g., changing the lighting, blurring, or the like) of the output frame or replacing the foreground pixels with a different object, such as a computer-generated object, an augmented reality (AR) object, or other suitable object.

The frame source 101 from which the frames 103 are received can include one or more image capture devices and/or one or more video capture devices (e.g., a digital camera, a digital video camera, a phone with a camera, a tablet with a camera, or other suitable capture device), an image and/or video storage device, an image and/or video archive containing stored images, an image and/or video server or content provider providing image and/or video data, an image and/or video feed interface receiving images from a video server or content provider, a computer graphics system for generating computer graphics image and/or video data, a combination of such sources, or other source of image frame content. In some cases, multiple frame sources can provide frames to the image segmentation system 102.

The image segmentation system 102 (and rendering engine 110) can be part of a computing device or multiple computing devices. In some cases, the computing device (or devices) that includes the image segmentation system 102 can also include one or more wireless transceivers for wireless communications and/or a display for displaying one or more images. In some examples, the computing device including the image segmentation system 102 can be an electronic device, such as a camera (e.g., a digital camera, an IP camera, a video camera, a camera phone, a video phone, or other suitable capture device), a mobile or stationary device (e.g., a telephone handset such as a smartphone, cellular telephone, or the like), a desktop computer, a laptop or notebook computer, a tablet computer, a set-top box, a television, a display device, a digital media player, a video gaming console, a video streaming device, or any other suitable electronic device. In some implementations, the image segmentation system 102 and the frame source 101 can be part of the same computing device. For example, in some cases, a camera, phone, tablet, and/or other device with a frame or image source (e.g., a camera, storage, or the like) can include an integrated image segmentation system (e.g., segmentation system 102). In some implementations, the image segmentation system 102 and the frame source 101 can be part of separate computing devices. In one illustrative example, the frame source 101 can include one or more cameras, and the computing device including the image segmentation system 102 can include a mobile or stationary telephone handset, a desktop computer, a laptop or notebook computer, a tablet computer, or other computing device.

In some examples, the image segmentation process performed by the image segmentation system 102 can be performed using a single camera system of a computing device. In other examples, the image segmentation performed by the image segmentation system 102 can be performed using a dual camera system of a computing device. In some cases, more than two cameras can be used in a camera system for performing the image segmentation process.

The segmentation engine 104 of the image segmentation system 102 can process a frame using image segmentation (also referred to as semantic segmentation) to generate a segmentation mask (also referred to as a segmentation map). For example, a segmentation frame M from a sequence of frames (e.g., frames 103) can be processed by the segmentation engine 104 in order to determine a segmentation mask for the segmentation frame M. A segmentation frame, as used herein, is any frame for which image segmentation is performed. In some examples, a segmentation mask can indicate which pixels in the frame are foreground pixels and which pixels are background pixels. For instance, the segmentation mask can include a first value (e.g., a value of 255, 1, or other suitable value) for pixels that belong to the person (the foreground) and a second value (e.g., a value of 0) for pixels that belong to the background. The first value (e.g., a 255) can correspond to a white color, in which case pixels corresponding to the object of interest are white. In such cases, the second value (e.g., a 0) can correspond to a black color, in which case pixels corresponding to the background are black. In some cases, a segmentation mask can include indications of other pixels (other than foreground and background pixels), such as pixels belonging to transition regions between foreground and background pixels, pixels belonging to classified objects other than an object of interest (e.g., a person) when a classification neural network is used to segment the frame, or the like. FIG. 7B is an example of a segmentation mask generated using an image shown in FIG. 7A. As described in more detail below, a trained deep neural network can be used to perform the image segmentation. In some cases, the neural network can include a classification network that is trained to identify multiple classes of objects, where one of the object classes is an object of interest (e.g., a person, a bicycle, a vehicle, or other suitable object of interest). In such cases, the segmentation mask can include a value for each pixel indicating to which class each pixel belongs.

As noted above, the segmentation engine 104 can perform a deep learning based image segmentation (using a trained deep neural network) in some cases. Illustrative examples of deep neural networks are described below with respect to FIG. 11-FIG. 14C. The complex nature of deep learning based image segmentation can cause the segmentation process to consume large amounts of computing resources and power, and can cause latencies and performance issues to occur.

Figure 4:
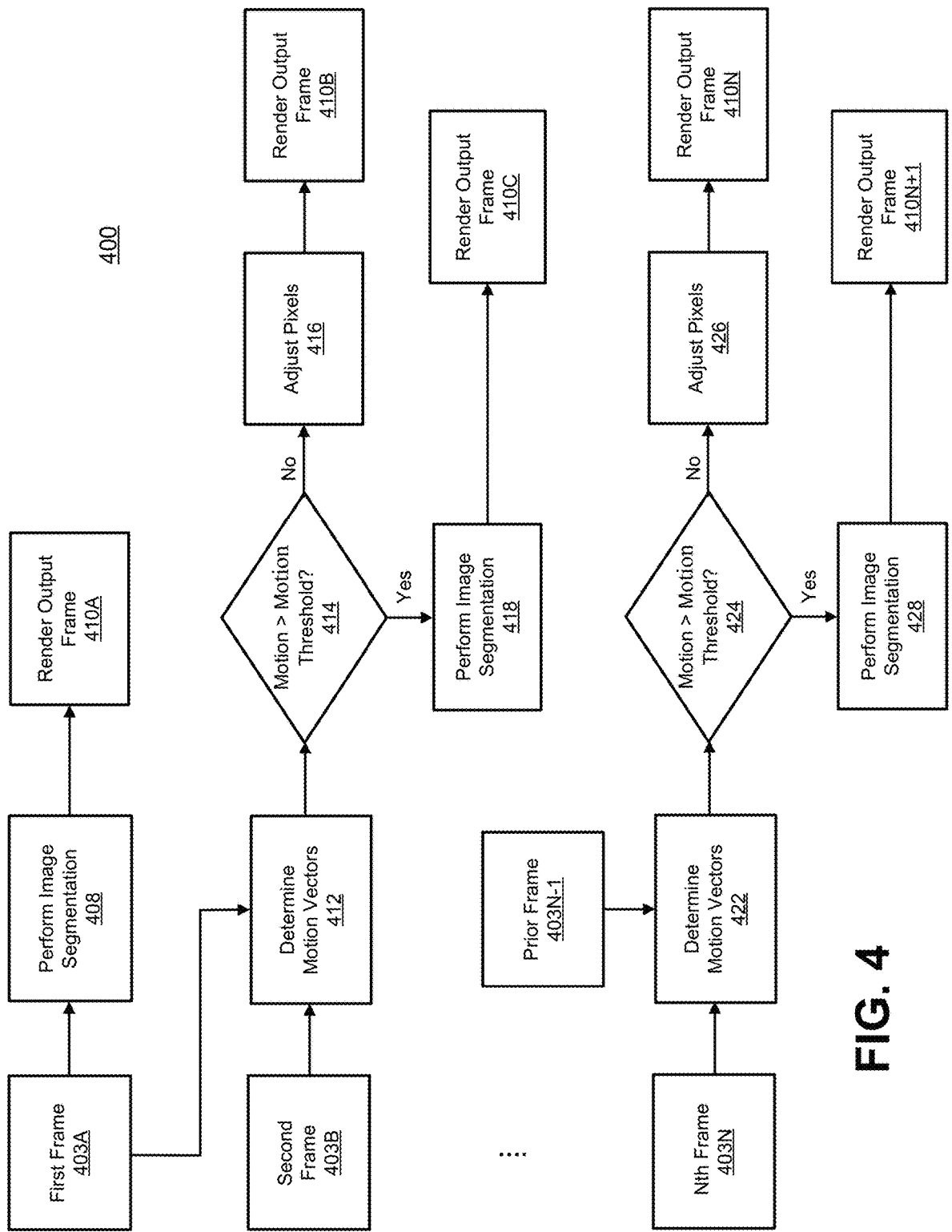
FIG. 4 is a flowchart illustrating an example of a process for performing motion-assisted image segmentation, in accordance with some examples.

FIG. 4 is a flow diagram illustrating an example of the motion-assisted image segmentation process that can be performed for a sequence of frames. In some examples, a deep neural network model (e.g., a Convolutional Neural Network (CNN), such as that shown in FIG. 12) can be trained to perform image segmentation (or semantic segmentation) of a frame from a sequence of frames. As described above, the image segmentation is a process that helps to separate the foreground of a frame from the background of the frame, or to segment the frame into multiple objects (e.g., as shown in FIG. 7B, where an object can include a background of the scene). The deep neural network model can be trained using training images. For instance, as described in more detail below, the deep neural network can adjust weights of nodes of different layers of the network using a training process called backpropagation, which can include a forward pass, a loss function, a backward pass, and a parameter (e.g., weight, bias, or other parameter) update. The forward pass, loss function, backward pass, and parameter update is performed for one training iteration. The process can be repeated for a certain number of iterations for each set of training images until the deep neural network model is trained well enough so that the weights (and/or other parameters) of the layers are accurately tuned. In some cases, reference images for training the deep neural network can be taken from well-known neural networks, such as Mask-RCNN, Tiramisu, VGG, among others.

At block 408, the motion-assisted image segmentation process 400 can perform image segmentation for a first frame 403A of the sequence of frames. In some examples, at block 408, a trained deep neural network (DNN) is applied to the first frame 403A to generate a DNN-based inference for the first frame. In some cases, the DNN-based image segmentation can be computed for a frame in less than one frame time. In other cases, it can take multiple frames to compute the DNN-based image segmentation for a frame. A result of the image segmentation (e.g., the DNN-based inference) is a segmentation mask for the first frame 403A. In some examples, the segmentation mask can include an indication for each pixel or group of pixels, indicating a class of object (e.g., person, vehicle, bicycle, and/or other object) the pixel or group of pixels belongs to. In one illustrative example, the segmentation mask can include a value for each pixel indicating to which class each pixel belongs. FIG. 7B illustrates one illustrative example of a segmentation mask generated using the image shown in FIG. 7A. FIG. 5B illustrates an example of a segmentation mask 503 shown with two classes of pixels (including foreground and background pixels) that correspond to the pixel locations of the frame 403A shown in FIG. 5A.

Based on the image segmentation performed at block 408, the process 400 can render (at block 410A) an output frame with a modified background having a visual effect (e.g., a blurred background, a blacked-out background, a whited-out background, a different background, and/or a background with another modified visual effect). In some examples, the output frame can have a modified foreground with a visual effect instead of or in addition to the modified background. For example, the foreground can be replaced with a different object (e.g., computer-generated object, an augmented reality (AR) object, or other suitable object).

The background pixels and/or the foreground pixels of the first frame 403A can be identified using the segmentation mask, and can be modified to render the output frame. For example, the pixels from the first frame 403A that correspond to segmentation pixels from the segmentation mask that have a background value (e.g., a value of 0) are identified as background pixels. Referring to the image 403A shown in FIG. 5A (described in further detail below) as an example, pixels P1, P2, P3, P4, P5, P6, and P7 in the frame 403A are identified as corresponding to foreground pixels, based on the corresponding foreground segmentation pixel locations (S1, S2, S3, S4, S5, S6, and S7) shown in FIG. 5B, and all pixels other pixels are identified as corresponding to background pixels. In some cases, the identified background pixels can be modified using the visual effect. In another example, the pixels from the output frame that correspond to segmentation pixels from the segmentation mask that have a foreground value (e.g., a value of 1) are identified as foreground pixels. In some cases, the foreground pixels can be modified using a visual effect.

For a subsequent frame of the sequence of frames, instead of performing image segmentation (e.g., generating a DNN-based inference) again, the motion-assisted image segmentation process can determine one or more motion characteristics of the current frame. For instance, the motion-assisted image segmentation process can compute motion vectors between the previous frame and the current frame. Subsequent frames (after the first frame 403A) are shown in FIG. 4 as a second frame 403B through an Nth frame 403N. For example, the process 400 can determine (at block 412) motion vectors between the first frame 403A and the second frame 403B, the process 400 can determine motion vectors between the second frame 403B and a third frame (not shown), the process 400 can determine (at block 422) motion vectors between an Nth frame 403N and the prior frame 403N-1, and so on. As described in more detail below, the determined motion between frames can be used to trigger performance of image segmentation for a next frame or used to modify or adjust pixels of the input frame.

In one illustrative example, the motion vectors can be computed using optical flow between frames (e.g., using an optical flow API). In some cases, optical flow maps (also referred to as motion vector maps) can be generated based on the computation of the optical flow vectors between frames. The optical flow maps can include a vector for each pixel in a frame, where each vector indicates a movement of a pixel between the frames, or vectors for less than all pixels in the frames. For instance, a dense optical flow can be computed between adjacent frames to generate optical flow (OF) vectors for each pixel in a frame, which can be included in a dense optical flow map. In another example, Lucas-Kanade optical flow can be computed between adjacent frames to generate OF vectors for certain pixels in a frame, which can be included in an optical flow map. Any other suitable type of optical flow technique or algorithm can be used to determine optical flow between frames. Each optical flow map can include a two-dimensional (2D) vector field, with each vector being a displacement vector showing the movement of points from a first frame to a second frame.

The optical flow maps can be computed between adjacent frames of the sequence of frames (e.g., between sets of adjacent frames f n and f {n−1}). Two adjacent frames can include two directly adjacent frames that are consecutively captured frames or two frames that are a certain distance apart (e.g., within two frames of one another, within three frames of one another, or other suitable distance) in a sequence of frames. In some implementations, the delta duration between the adjacent frames should be equal to or less than 33 ms in order to generate a good estimation for the adjusted input frame. For instance, for a frame sequence having a 30 fps frame rate, adjacent frames may need to be two directly adjacent frames that are approximately 33 ms apart from one another. The optical flow between adjacent frames can be computed in less than one frame time.

Optical flow from frame M ($F_M$) to frame M+1 ($F_M$+1) can be given by $O_{M,M+1}=\text{dof}(F_M, F_M+1)$, where dof is the dense optical flow. Any suitable optical flow process can be used to generate the optical flow maps. In one illustrative example, a pixel I(x, y, t) in the segmentation frame M can move by a distance ($\Delta x, \Delta y$) in a next frame M+t taken after a certain time $\Delta t$. Assuming the pixels are the same and the intensity does not change between the segmentation frame M and the next frame M+t, the following equation can be assumed:

$$I(x,y,t)=I(x+\Delta x,y+\Delta y,t+\Delta t)$$  Equation(1).

By taking the Taylor series approximation of the right-hand side of Equation (1) above, and then removing common terms and dividing by $\Delta t$, an optical flow equation can be derived:

$$f_x u + f_y v + f_t = 0,$$  Equation (2), where:

$$f_x = \frac{df}{dx};$$

$$f_y = \frac{df}{dy};$$

$$f_t = \frac{df}{dt};$$

$$u = \frac{\Delta x}{\Delta t}; \text{ and}$$

$$v = \frac{\Delta y}{\Delta t}.$$

Using the optical flow Equation (2), the image gradients $f_x$ and $f_y$ can be found along with the gradient along time (denoted as $f_t$). The terms u and v are the x and y components of the velocity or optical flow of I(x, y, t), and are unknown. An estimation technique may be needed because the optical flow equation cannot be solved with two unknown variables. Any suitable estimation technique can be used to estimate the optical flow. Examples of such estimation techniques include differential methods (e.g., Lucas-Kanade estimation, Horn-Schunck estimation, Buxton-Buxton estimation, or other suitable differential method), phase correlation, block-based methods, or other suitable estimation technique. For instance, Lucas-Kanade assumes that the optical flow (displacement of the image pixel) is small and approximately constant in a local neighborhood of the pixel I, and solves the basic optical flow equations for all the pixels in that neighborhood using the least squares method.

As noted above, FIG. 5A is a diagram illustrating an example of the first frame 403A of a sequence of frames, shown with foreground pixels P1, P2, P3, P4, P5, P6, and P7 (corresponding to an object) at illustrative pixel locations. The other pixels in the first frame 403A can be considered as a second object. The second object can be a background in this example, in which case the other pixels are background pixels. The frame 403A is shown with dimensions of w pixels wide by h pixels high (denoted as w×h). One of ordinary skill will understand that the first frame 403A can include many more pixel locations than those illustrated in FIG. 5A. For example, the frame 403A can include a 4K (or ultra-high definition (UHD)) frame at a resolution of 3,840× 2,160 pixels, an HD frame at a resolution of 1,920×1,080 pixels, or any other suitable frame having another resolution. A pixel P1 is shown at a pixel location 502A. The pixel location 502A can include a (w, h) pixel location of (3, 1) relative to the top-left-most pixel location of (0, 0). The pixel P1 is used for illustrative purposes and can correspond to any suitable point on the object of interest, such as the point of a nose of a person.

Figure 5A:
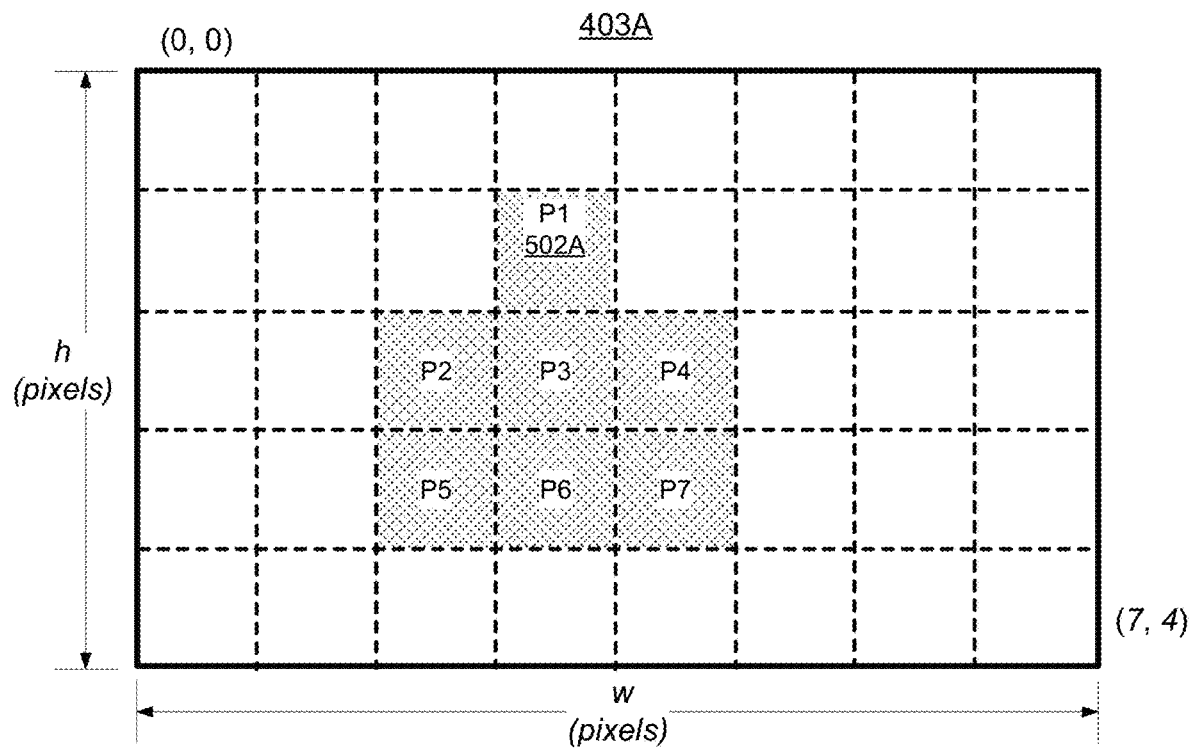
FIG. 5A is a diagram illustrating an example of a frame shown with pixel locations of pixels corresponding to an object, in accordance with some examples.
Figure 5B:
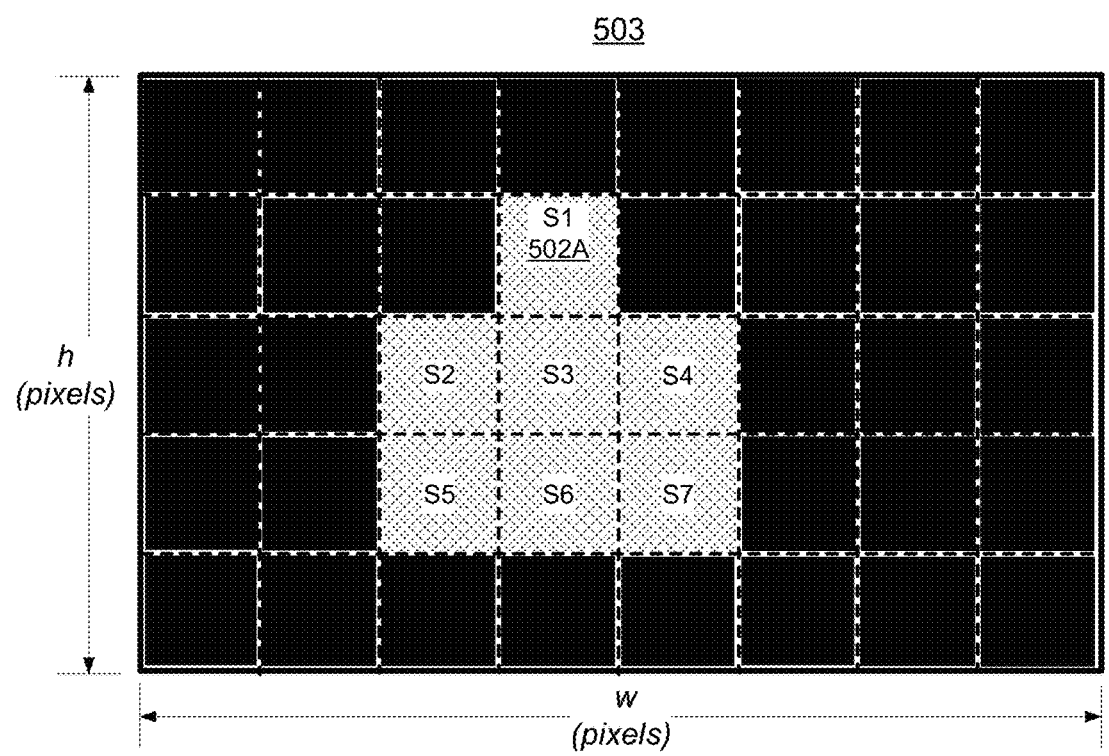
FIG. 5B is a diagram illustrating an example of a segmentation mask shown with foreground and background pixels that correspond to the pixel locations of the frame shown in FIG. 5A, in accordance with some examples.

FIG. 5B is a diagram illustrating an example of an inference segmentation mask 503 generated based on application of a DNN-based image segmentation to the first frame 403A shown in FIG. 5A. The inference segmentation mask 503 has the same dimensions as that of the first frame 403A (w pixels×h pixels). For example, the segmentation pixels S1, S2, S3, S4, S5, S6, and S7 (e.g., having a value of 1 in the segmentation mask 503) correspond, respectively, to foreground pixels P1, P2, P3, P4, P5, P6, and P7 that represent a foreground object. For example, the segmentation pixel S1 has a same location (502A) in the segmentation mask 503 as the location of the corresponding pixel P1 in the first frame 403A. The other segmentation pixels in the inference segmentation mask 503 are background pixels (e.g., having a value of 0 in the segmentation mask 503).

Figure 5C:
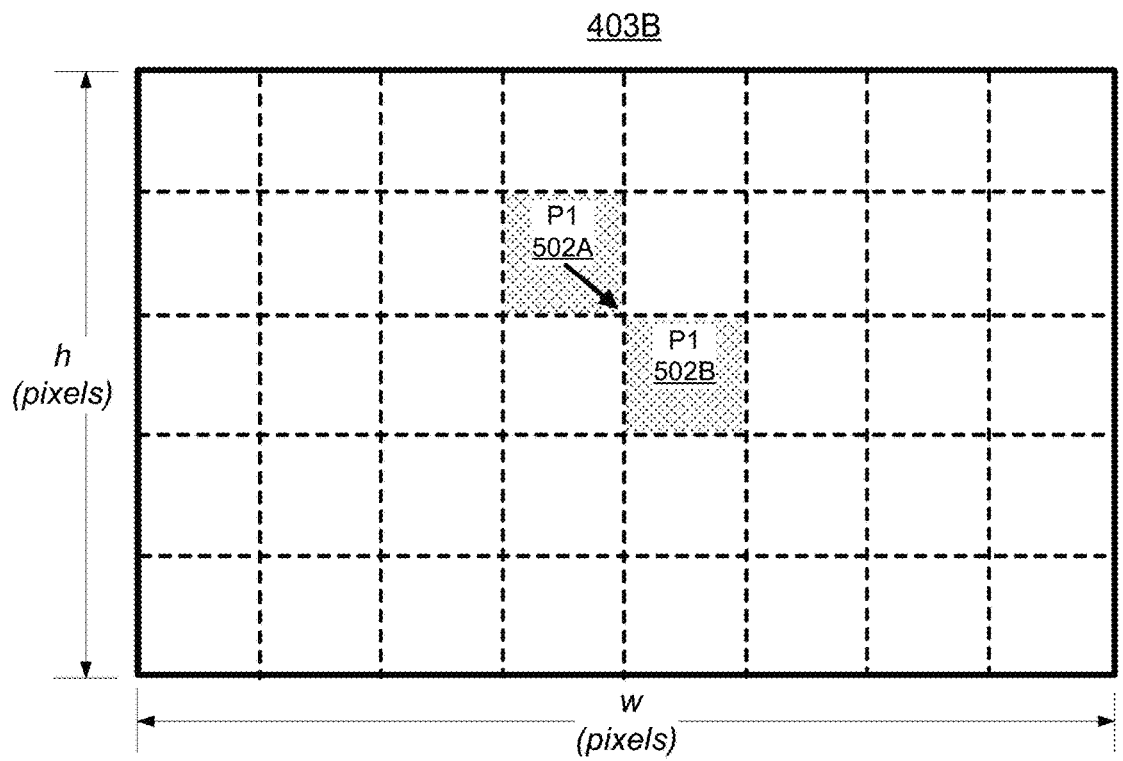
FIG. 5C is a diagram illustrating an example of a next frame shown with updated pixel locations as compared to the frame illustrated in FIG. 5A, in accordance with some examples.

FIG. 5C is a diagram illustrating an example of a second frame 403B that is adjacent to the first frame 403A. For instance, the second frame 403B can occur immediately after the first frame 403A in the sequence of frames. The second frame 403B has the same corresponding pixels P1, P2, P3, P4, P5, P6, and P7 as that of the first frame 403A (with dimension w×h). As shown, the pixel P1 has moved from the pixel location 502A in the first frame 403A to an updated pixel location 502B in the second frame 403B. The updated pixel location 502B of P1 can include a (w, h) pixel location of (4, 2) relative to the top-left-most pixel location of (0, 0). An optical flow vector can be computed for the pixel P1, indicating the velocity or optical flow of the pixel P1 from the first frame 403A to the second frame 403B. In one illustrative example, the optical flow vector for the pixel P1 between the frames 403A and 403B is (1, 1), indicating the pixel P1 has moved one pixel location to the right and one pixel location down.

Figure 5D:
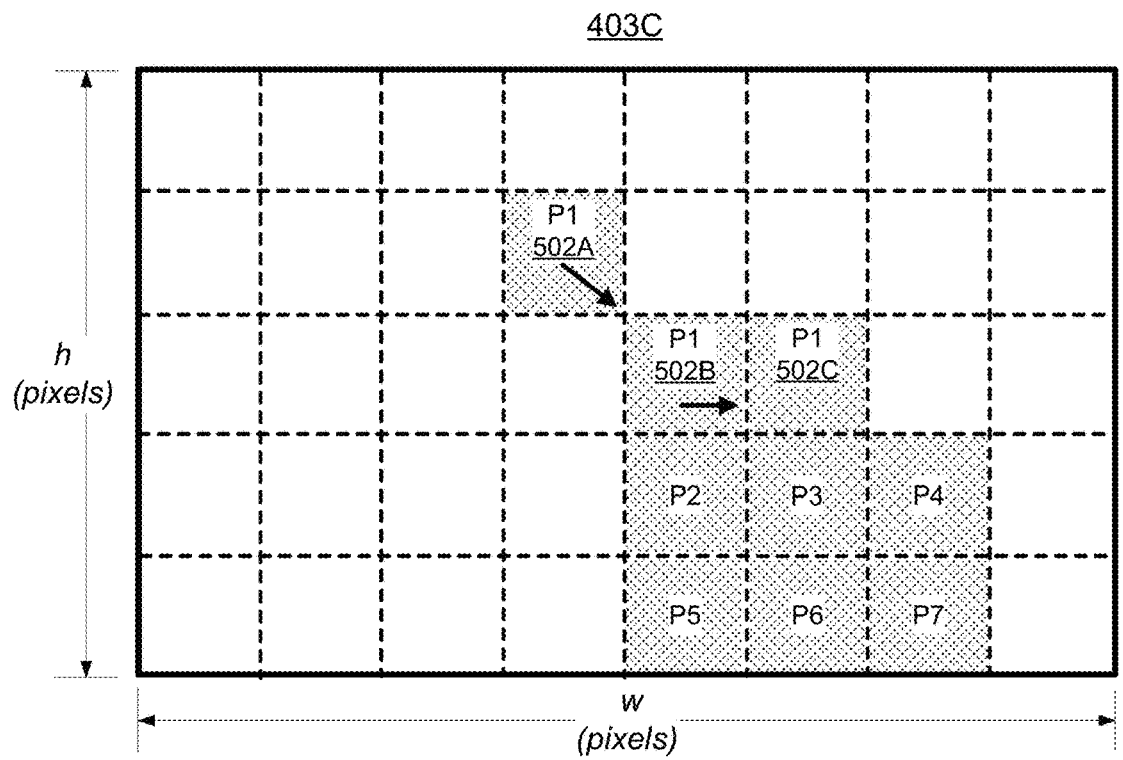
FIG. 5D is a diagram illustrating an example of a next frame shown with updated pixel locations as compared to the frame illustrated in FIG. 5C, in accordance with some examples.

FIG. 5D is a diagram illustrating an example of a third frame 403C that is adjacent to the second frame 403B. For instance, the third frame 403C can occur immediately after the second frame 403B in the sequence of frames. The third frame 403C has the same corresponding pixels P1, P2, P3, P4, P5, P6, and P7 as that of the first frame 403A and the second frame 403B (with dimensions w×h). As shown, the pixel P1 has moved from pixel location 502B in frame 403B to an updated pixel location 502C in the frame 403C. The updated pixel location 502C can include a (w, h) pixel location of (5, 2) relative to the top-left-most pixel location of (0, 0). An optical flow vector can be computed for the pixel P1 from the second frame 403B to the third frame 403C. In one illustrative example, the optical flow vector for the pixel P1 between the frames 403B and 403C is (1, 0), indicating the pixel P1 has moved one pixel location to the right.

As described above, the motion vectors (e.g., optical flow vectors from an optical flow map or motion vector map) can be used as a motion based trigger to determine when to perform image segmentation for a frame (e.g., in order to generate a DNN-based segmentation inference), resulting in a segmentation mask being generated for the frame. For example, if the motion vectors indicate change in movement between frames above a certain motion threshold, image segmentation can be performed for a target frame (e.g., either the current frame or a next frame) to generate a segmentation mask for the target frame. Otherwise, if the motion vectors do not indicate a change above the motion threshold, the processed previous frame (the output frame) and the motion vectors between the previous and current frame can be used to generate the processed version of the current frame (e.g., the next output frame). For example, the optical flow vectors can be used to determine where the pixels in the current frame should be located relative to the pixels in the previous output frame.

Referring to FIG. 4, the process 400 can determine, at block 412, motion vectors between the second frame 403B and the first frame 403A. For example, the process 400 can perform an optical flow computation (as described above) for the second frame 403B to generate optical flow vectors between the second frame 403B and the first frame 403A. In some cases, the computed optical flow vectors can be included in a motion vector map. The process 400 can determine whether the amount of motion is greater than the motion threshold. The amount of motion can be determined based on a displacement of the motion vectors computed between the second frame 403B and the first frame 403A.

In some cases, a single representative displacement value can be used instead of each displacement of each motion vector (e.g., in a motion vector map). In some examples, a single representative displacement value can be determined based on a weighted displacement (of the motion vectors) for every single pixel in the frame. For instance, on a pixel by pixel basis, the difference in the motion of each pixel can be computed, and then the differences can be added together (and in some cases averaged). In some cases, the motion differences can be weighted based on the location of the pixels, and the weighted displacement values can be added together.

In such an example, the representative displacement value can be compared to the motion threshold. In one illustrative example, to quantify and generate a value against a motion vector map (calculated between a previous frame and a current frame), and to compare with the motion threshold, an average or weighted average can be determined for the motion-difference of the pixels being tracked. The number of tracked pixels can depend on the optical-flow algorithm being used (e.g. dense optical flow, Lucas-Kanade optical flow, or other optical flow). In some examples, a weighted Lp-norm based computation can be performed (e.g., L0-norm to get number of tracked pixels exceeding the threshold, L1-norm for an average value exceeding the threshold, and so on). The particular type of computation used to determine the value can be based on hyper-parameter tuning, which can be based on the particular application and underlying platform (e.g., compute hardware plus software environment, or other environment).

The motion threshold can include any suitable measure of motion. In some cases, the motion threshold can include one or more parameters (e.g., one or more hyper-parameters) that affect number of image segmentation inferences performed. One example of a motion threshold parameter can be based on movement (e.g., of pixels) in one or more of the x-y directions (the x-axis being the horizontal axis of a frame and the y-axis being the vertical axis of the frame). For instance, the motion threshold parameter can be set to a certain amount of movement in the x-y directions, such as an absolute value in the x-y directions (e.g., an (x, y) movement of (2, 2), indicating two pixels to the right or left, and two pixels upward or downward). Another example of a motion threshold parameter can be based on a percentage value of overall image size in one or more of the x-y directions. In one illustrative example, the percentage of the overall image size can be 10% of the image size, in which case movement in the x-y directions above 10% of the image size would be above the motion threshold. In another example, different motion threshold parameter values (e.g., percentage value of overall image size in one or more of the x-y directions, absolute value in the x-y directions, or other value) can be assigned for different regions of the image. For example, some regions of the image can have lower thresholds if it is desired that the system is highly accurate for those specific regions of the image. In another example, multiple thresholds can be used. For instance, two thresholds (a soft threshold and a hard threshold) can be used to determine whether the amount of motion is greater than the motion threshold. In such an example, if the soft threshold is exceeded, optical-flow processing can be performed on the current frame (e.g., the second frame 403B) and can perform image segmentation (e.g., an image segmentation inference) on the next frame. If the hard threshold is exceeded (e.g., too much variation has occurred between frames), the last output frame can be used for the current frame (instead of processing the current frame to generate an output image), and image segmentation can be performed for the next frame. Any other suitable type of motion threshold can be used. The choice of which type of motion threshold to use can be based on the particular implementation pipeline for the particular use-case, based on the desired accuracy, and/or based on other factors.

The value of the one or more parameters indicating the motion threshold can be determined based on the nature of the application for which the motion-assisted image segmentation is to be applied, and/or also to achieve needed levels of performance, accuracy, power or any other performance indicators. In one illustrative example, in safety-critical use-cases (e.g., self-driving cars, unmanned aerial vehicles, among others), it may be desirable to use a low threshold (causing more image segmentation inferences to be run) to achieve higher accuracy based on more frequent image segmentation inferences being run.

At block 414, if it is determined that the motion determined for the second frame 403B is greater than the motion threshold, the process 400 can, at block 418, perform image segmentation for a target frame. The target frame can include the second frame 403B (the current frame in this case) or a next frame of the video sequence (e.g., the next frame can include the frame immediately following the second frame 403B, two frames after the second frame 403B, three frames after the second frame 403B, or other frame following the second frame 403B). When image segmentation is performed for the current frame (frame 403B in this case) based on the movement of the current frame being above the motion threshold, at block 410C, an output frame can then be rendered for the current frame using the segmentation mask resulting from the image segmentation performed at block 418 on the second frame 403B.

When image segmentation is performed for the next frame based on the movement of the current frame (frame 403B in this case) being above the motion threshold, at block 410C, an output frame can then be rendered for the next frame using the segmentation mask resulting from the image segmentation performed at block 418 on the second frame 403B. The next frame can include a third frame (not shown in FIG. 4), which can be a frame immediately after the second frame 403B in the sequence of frames. In some cases, the next frame can include a frame that is not immediately following the second frame 403B, such as two frames after the second frame 403B, three frames after the second frame 403B, or other frame following the second frame 403B. In some cases, when image segmentation is to be performed for the next frame based on the motion of the current frame being greater than the motion threshold, the current frame can be dropped. In some implementations, when the current frame is dropped, the last output frame (e.g., the most recently-generated output frame) can be rendered again as an output frame (instead of an output frame that is based on the current frame). In some cases, when image segmentation is to be performed for the next frame, the current frame can be used as-is for the output frame. In some cases, when image segmentation is to be performed for the next frame, an output frame can be generated by adjusting the pixels of the current frame to new locations based on the motion vector values. In some cases, when a two-threshold based approach is used (a soft threshold and a hard threshold), optical-flow based processing can be applied to the current frame and image segmentation can be performed for the next frame, as described above.

In some examples, the output frame can be rendered at block 410C with background pixels having a visual effect (e.g., the background pixels are rendered as black pixels, white pixels, blurred pixels, or other visual effect). In some examples, the output frame can be rendered with foreground pixels having a visual effect (e.g., some or all of the foreground pixels are replaced with an alternative object, such as an augmented reality object, an avatar, or the like, or other visual effect). FIG. 7C illustrates an example of a segmentation overlay resulting from the segmentation mask shown in FIG. 7B (generated by performing image segmentation on the image shown in FIG. 7A) being overlaid over the image shown in FIG. 7A. FIG. 7D illustrates an example of a rendered output frame using the segmentation mask, where the background is removed.

Using such a technique, the motion can be used as a trigger to cause the image segmentation process to be performed for a next frame. For instance, it can be beneficial to perform image segmentation again when the motion is greater than the motion threshold, because the motion indicates that the position of the segmentation map is going to change by a significant amount. In one illustrative example, while in a seated position, a user can be on a video call using the front-facing camera of a computing device. In such a scenario, a segmentation mask may be generated around the head and upper body of the user (due to the other portions of the body being hidden from view, such as under a desk), with the rest of the image being segmented as background. After several frames, the user may decide to stand up, in which case the segmentation mask will change because more of the user will be in the frame (e.g., the user's torso, waste, and part of the legs are now captured by an image). In such a situation, it can be beneficial to run the image segmentation again to be sure that the segmentation mask is accurate.

As described above, if it is determined that the amount of motion (e.g., the motion vector difference) is beyond a motion threshold for a current frame, image segmentation can be performed using a target frame. The target frame can include the current frame or a next frame after the current frame. For example, in some cases, the next frame can be processed using image segmentation instead of the current frame, in order to avoid both computing motion vectors and performing image segmentation (e.g., a deep neural network based CNN inference) for the same frame. Such a technique can reduce the risk of not finishing the motion vector and image segmentation in the time duration associated with a frame (e.g., 33 ms in a 30 fps video). For example, a high definition 1080p video can be run at approximately 24 to 30 fps on certain computing devices (e.g., on a smartphone), which results in approximately 33 ms per frame. In some cases, a compressed neural network model (e.g., Squeezenet, Mobilenet, or other model) can be run at approximately 12 ms, in which case the model can be run for a frame without any lag (e.g., the neural network processing can be completed within a single frame duration). Other frame processing may also be performed (e.g., decoding, object detection, among others), in which case there may not be time to perform motion vector computation.

In some cases, such as when both image segmentation and motion vector determination can be performed in less than the time associated with one frame (e.g., 33 ms in a 30 fps frame rate video), the image segmentation can be performed for the current frame for which the motion is determined to be greater than the motion threshold.

When the motion of the current frame (the motion vectors between a previous frame and the current frame) is less than the motion threshold, the output pixels for the current frame can be modified based on the calculated motion vectors. The motion vectors can be used to determine the location of output pixels of the second frame with respect to the output pixels of the previous frame. Referring to block 414, if it is determined that the motion corresponding to the second frame 403B is not greater than (or is less than) the motion threshold, the process 400 can, at block 416, adjust pixels of the second frame 403B using the motion vectors determined at block 412. For instance, the motion vectors determined for the second frame 403B can be used to determine where the pixels in the second frame 403B should be located relative to the pixels in the previous output frame (generated at block 418). Referring to FIG. 5A and FIG. 5C, the optical flow vector between the second frame 403B and the first frame 403A can indicate that the foreground pixel P1 should be at location 502B for the second frame 403A. Using the optical flow vectors to determine the updated locations of the foreground and background pixels can eliminate the need to perform image segmentation for frames when motion is below the motion threshold.

The process 400 can render an output frame at block 410B based on the adjusted pixel locations determined using the motion vectors. For example, the output frame can be rendered with background pixels having a visual effect (e.g., the background pixels are rendered as black pixels, white pixels, blurred pixels, or other visual effect). In another example, the output frame can be rendered with foreground pixels having a visual effect (e.g., some or all of the foreground pixels are replaced with an alternative object, such as an augmented reality object, an avatar, or the like, or other visual effect).

An Nth frame 403N can be obtained by the process 400, and the process 400 can determine (at block 422) motion vectors between a prior frame 403N-1 and the Nth frame 403N. The prior frame 403N-1 can include the frame immediately before the Nth frame 403N, or any previous frame (e.g., two frames prior to the Nth frame 403N, three frames prior to the Nth frame 403N, and so on). At block 422, the process 400 can determine motion vectors between the Nth frame 403N and the prior frame 403N-1. For example, the process 400 can perform an optical flow computation (as described above) for the Nth frame 403N to generate optical flow vectors between the Nth frame 403N and the prior frame 403N-1.

The process 400 can determine whether the amount of motion is greater than the motion threshold. As described above, the amount of motion can be determined based on a displacement of the motion vectors computed between the second frame 403B and the first frame 403A. At block 424, if it is determined that the motion determined for the Nth frame 403N is greater than the motion threshold, the process 400 can perform image segmentation at block 428 for the next frame of the video sequence (e.g., the frame immediately following the Nth frame 403N, two frames after the Nth frame 403N, three frames after the Nth frame 403N, or other frame following the Nth frame 403N).

At block 410N+1, an output frame can be rendered for the next frame after the Nth frame 403N. The output frame at block 410N+1 can be rendered using the segmentation mask resulting from the image segmentation performed at block 428 on the Nth frame 403N. In some examples, the output frame can be rendered with background pixels having a visual effect (e.g., the background pixels are rendered as black pixels, white pixels, blurred pixels, or other visual effect). In some examples, the output frame can be rendered with foreground pixels having a visual effect (e.g., some or all of the foreground pixels are replaced with an alternative object, such as an augmented reality object, an avatar, or the like, or other visual effect).

At block 424, if it is determined that the motion corresponding to the Nth frame 403N is not greater than (or is less than) the motion threshold, the process 400 can, at block 426, adjust pixels of the Nth frame 403N using the motion vectors determined at block 422. For example, the motion vectors determined for the prior frame 403N-1 can be used to determine where the pixels in the Nth frame 403N should be located relative to the pixels in the previous output frame. At block 410N, the process 400 can render an output frame based on the adjusted pixel locations determined at block 426 using the motion vectors. For example, the output frame can be rendered with background pixels having a visual effect (e.g., the background pixels are rendered as black pixels, white pixels, blurred pixels, or other visual effect) and/or with foreground pixels having a visual effect (e.g., some or all of the foreground pixels are replaced with an alternative object, such as an augmented reality object, an avatar, or the like, or other visual effect).

As noted above, one example of a visual effect that can be applied to the background and/or foreground of pixels can be a blur effect. Blur can be applied to the pixels using any suitable technique, such as by convolving a kernel with the image. The kernel can include any suitable blurring kernel, such as a Gaussian blur function (e.g., a 3×3 Gaussian blur kernel, a 5×5 Gaussian blur kernel, or the like), a box blur function (e.g., using a 3×3 kernel or the like), disc blur rendering (circular bokeh, hexagonal bokeh, star bokeh, etc.), or other suitable blurring function. The blur kernel (e.g., Gaussian blur kernel or the like) and the image size are variable based on the intensity requested by the user. In some examples, because large kernels can be computationally intensive, a smaller kernel can be used on a downscaled image, in which case the image can be upscaled after applying the blur kernel.

In another example, a visual effect can include blacking out the background and/or foreground pixels. In some examples, the pixels can be blacked out by changing a pixel value of each background pixel to a black color (e.g., to a pixel value of 0 out of a pixel value range of 0-255).

In another example, the foreground pixels of the output frame can be identified using the segmentation mask or the motion vectors, and can be replaced with a computer-generated (CG) object, an augmented reality (AR) object, or other suitable object. For example, the face of a user of the computing device can be replaced with an animated animal face, a character from a game, movie, or show, an avatar of the user, or with any other CG or AR object.

The motion-assisted image segmentation process shown in FIG. 4 can continue to be performed for all frames of the sequence of frames. The motion-assisted image segmentation is a significant enhancement that saves the number of inferences that are run for a video sequence, thus improving latency, performance, and power. Such a solution provides an automated method of real-time adaptive foreground and/or background modification (e.g., de-emphasization of the background, etc.) in the midst of a capturing frames on the device (e.g., during a video call, during a virtual reality experience, during a gaming session, among other applications). The techniques described herein can be used for any image-based application, such as video calls, Bokeh effects. For example, the techniques can be used for an application where separation of a main subject (the foreground) from the background is desired.

The number of times image segmentation is performed (e.g., the number of neural network inferences run) using the motion-assisted image segmentation is not pre-defined at regular intervals, like other solutions that are static in nature. Rather, the number of times image segmentation is performed is based on how much the image has changed (as determined by the motion or motion vector difference). Such a solution can drastically reduce the number of times image segmentation is performed, thus improving performance and power.

In some examples, as opposed to running the motion vector based detection on the entire image, motion vectors can be determined only for a subsection of a frame (e.g., the main area of interest within an image, such as a place where a user is typically present), and image segmentation can be performed if an appreciable change is detected in that subsection. Such examples may have a faster inference because the motion vector computations are performed on a smaller set of numbers. In some cases, users can turn the optical-flow based processing off and have image segmentation (e.g., neural network inferences) run on every single frame in certain situations, such as mission-critical use-cases.

FIG. 6 is a flowchart illustrating an example of a process 600 of segmenting one or more frames using the image segmentation techniques described herein. At block 602, the process 600 includes performing image segmentation on a first frame of a plurality of frames. The image segmentation results in generation of a segmentation mask. In some implementations, the image segmentation mask is performed using a neural network trained to segment foreground pixels of a frame from background pixels of the frame. Foreground pixels can correspond to objects that are identified in a frame. For example, the neural network can be trained to classify certain objects in frames, in which case pixels corresponding to the classified objects can be referred to as foreground pixels, and all other pixels can be referred to as background pixels.

At block 604, the process 600 includes modifying pixels of the first frame using the segmentation mask. For instance, the pixels of the first frame can be modified to generate an output frame, where the output frame includes the modified pixels of the first frame. Each pixel of the output frame can have a corresponding pixel in the segmentation mask, as shown in FIG. 5A and FIG. 5B (e.g., both the output frame and the segmentation mask can have pixels at pixel coordinates (0,0), (1,0), etc. relative to the top-left corner of the output frame and segmentation mask). In some examples, background pixels of the first frame are modified. In one example, the output frame can be rendered with background pixels from the first frame having a visual effect (e.g., the background pixels are rendered as black pixels, white pixels, blurred pixels, or other visual effect). In some examples, the foreground pixels of the first frame are modified. In some examples, the background pixels and the foreground pixels of the output frame are modified. In one example, the output frame can be rendered with foreground pixels from the first frame having a visual effect (e.g., some or all of the foreground pixels are replaced with an alternative object, such as an augmented reality object, an avatar, or the like, or other visual effect). In some aspects, the process 600 can display the output frame including the modified pixels of the first frame.

At block 606, the process 600 includes determining an amount of movement of one or more pixels of a second frame relative to a previous frame. The previous frame occurs in the plurality of frames prior to the second frame. In some examples, the second frame is a next frame after the first frame in the plurality of frames. In such examples, the previous frame can be the first frame. In some examples, the second frame is not a next frame after the first frame in the plurality of frames (in which case the second frame is multiple frames after the first frame). In such examples, the previous frame is an intervening frame between the first frame and the second frame.

The amount of movement is determined based on one or more motion characteristics of the second frame. In some examples, the one or more motion characteristics of the second frame include motion vectors between pixels of the previous frame and pixels of the second frame. In some cases, the motion vectors can be determined using optical flow techniques. Any other suitable technique can be used to determine the motion vectors.

At block 608, the process 600 includes determining the amount of movement of the one or more pixels of the second frame is above a motion threshold. As described above, the amount of movement can be compared to the motion threshold based on a displacement of the motion vectors between the second frame and the previous frame. At block 610, the process 600 includes, in response to determining the amount of movement of the one or more pixels of the second frame is above the motion threshold, performing image segmentation on a target frame. The image segmentation performed on the target frame results in generation of an additional segmentation mask. As described above, the target frame can include the second frame or a next frame occurring after the second frame. For example, the target frame can be a third frame occurring in the plurality of frames after the second frame.

At block 612, the process 600 includes modifying pixels of the target frame using the additional segmentation mask. The pixels of the target frame can be modified similarly as those of the first frame. An output frame can be generated that includes the modified pixels of the second frame. In some examples, background pixels of the target frame are modified (e.g., the background pixels are rendered as black pixels, white pixels, blurred pixels, or other visual effect). In some examples, the foreground pixels of the target frame are modified (e.g., some or all of the foreground pixels are replaced with an alternative object, such as an augmented reality object, an avatar, or the like, or other visual effect). In some aspects, the process 600 can display the output frame including the modified pixels of the second frame.

In some examples, the process 600 can include obtaining a third frame of the plurality of frames, and determining an amount of movement of one or more pixels of the third frame relative to a fourth frame. Here, the fourth frame occurs in the plurality of frames prior to the third frame. The process 600 can further include determining the amount of movement of the one or more pixels of the third frame is below the motion threshold and, in response to determining the amount of movement of the one or more pixels of the third frame is below the motion threshold, determining not to perform image segmentation using the third frame.

In some implementations, the process 600 can include, in response to determining not to perform image segmentation using the third frame, determining movement of pixels of the third frame relative to pixels of the fourth frame, and determining locations of the pixels in the third frame based on the movement of the pixels of the third frame relative to the pixels of the fourth frame. An output frame can then be generated for the third frame by adjusting the pixels of the third frame to the determined locations. In some examples, the movement of the pixels of the third frame relative to the pixels of the fourth frame is determined using motion vectors determined between the pixels of the third frame and the pixels of the fourth frame. In some aspects, the locations of the pixels in the third frame are determined using the motion vectors.

In some examples, the process 600 may be performed by a computing device or an apparatus, which can include the image segmentation system 102 shown in FIG. 1. In some cases, the computing device or apparatus may include a processor, microprocessor, microcomputer, or other component of a device that is configured to carry out the steps of process 600. In some examples, the computing device or apparatus may include one or more cameras configured to capture images and/or video data (e.g., a video sequence) including frames. For example, the computing device may include a mobile device with a camera (e.g., a digital camera, an IP camera, a mobile phone or tablet including a camera, or other type of device with a camera). In some cases, the computing device may include a display for displaying the output images or frames. In some cases, the computing device may include a video codec. In some examples, a camera or other capture device that captures the images and/or video data is separate from the computing device, in which case the computing device receives the captured video data. The computing device may further include a network interface configured to communicate the video data. The network interface may be configured to communicate Internet Protocol (IP) based data or other suitable network data.

Process 600 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Another image processing technique is object detection. Object detection in images and videos is a widely used feature in many devices and systems. Many applications use object detection, including, for example, package delivery, object tracking, defense and rescue operations, among others. In some cases, object detection can be performed using a machine-learning based object detection process (e.g., using a trained deep learning network, such as a convolutional neural network or other suitable deep learning network). Given the compute requirements of running each frame through a machine-learning system (e.g., a convolutional neural network), the object detection process is a power-intensive operation that consumes large amounts of battery and other resources, and can also lead to sub-optimal performance (e.g., slow or delayed detection results, inaccurate detection results, among others). Object detection has different priorities based on the context of usage. For instance, a balance is typically made between accuracy and power/performance, with one of the two being more important in some contexts than the other. In one illustrative example in safety-critical contexts (e.g., self-driving cars, unmanned aerial vehicles, medical applications, etc.), the balance may be tilted in favor of accuracy over performance and/or power. However, in some applications, such as mobile device applications, there may be a need to deliver optimal gains in power and performance.

Systems, methods, and computer-readable media are also described herein for performing motion-assisted object detection. The motion-assisted object detection process can obtain a first frame of a sequence of frames, and object detection can be performed on the first frame in order to detect one or more objects in the frame. The object detection can include a machine-learning based object detection process (e.g., using a trained deep learning network). The object detection process can output bounding regions (e.g., bounding boxes or bounding regions having other shapes) representing the locations of the detected objects. In other cases, other types of object detection processes can be used, such as blob-based object detection or other object detection.

For the subsequent frames after the first frame, instead of performing object detection again (e.g., by running a neural network inference), motion vectors can be computed between the previous and the current frames (e.g., using optical flow, such as target-accelerated API(s)), and only perform another object detection iteration (e.g., another neural network inference) if necessary on the next frame (or the current frame in some cases). For instance, when the motion is below a motion threshold (similar to the motion threshold described above), the bounding boxes can be moved based on the motion vector difference. When the motion is greater than the motion threshold, object detection can be performed (e.g., a new neural network inference can be run) for the next frame.

Figure 8:
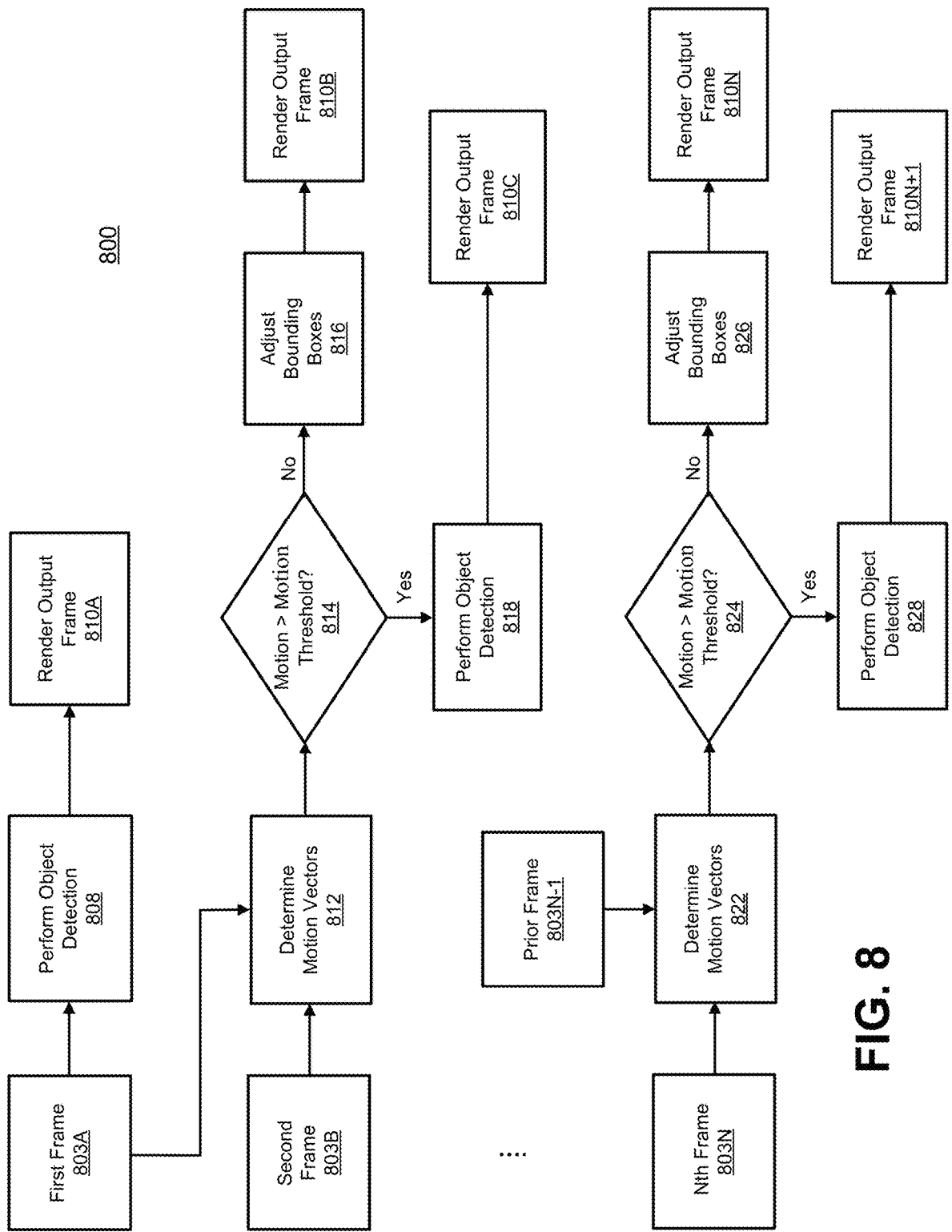
FIG. 8 is a flowchart illustrating an example of a process for performing motion-assisted object detection, in accordance with some examples.

FIG. 8 is a flow diagram illustrating an example of the motion-assisted object detection process that can be performed for a sequence of frames. In some examples, a deep neural network model (e.g., a Convolutional Neural Network (CNN), such as that shown in FIG. 12) can be trained to perform object detection for a frame from a sequence of frames. As described above, object detection is a process that detects one or more objects in a frame or image. In some cases, a detected object can be classified as a particular class of object. The deep neural network model can be trained using training images. For instance, as described in more detail below, the deep neural network can adjust weights of nodes of different layers of the network using a training process called backpropagation, which can include a forward pass, a loss function, a backward pass, and a parameter (e.g., weight, bias, or other parameter) update. In some cases, reference images for training the deep neural network can be taken from well-known neural networks, such as Mask-RCNN, Tiramisu, VGG, among others.

The motion-assisted object detection process 800 can obtain a first frame 803A of the sequence of frames, and at block 808, can perform object detection for the first frame 803A. In some examples, at block 808, a trained deep neural network (DNN) is applied to the first frame 803A to generate a DNN-based inference for the first frame. In some cases, the DNN-based object detection can be computed for a frame in less than one frame time. In other cases, it can take multiple frames to compute the DNN-based object detection for a frame. A result of the object detection (e.g., the DNN-based inference) can include one or more bounding boxes (or other bounding regions) being generated for the first frame 803A. In some cases, the result of object detection can also include a classification of each detected object (e.g., a person, a car, a bicycle, or other suitable object).

Figure 9:
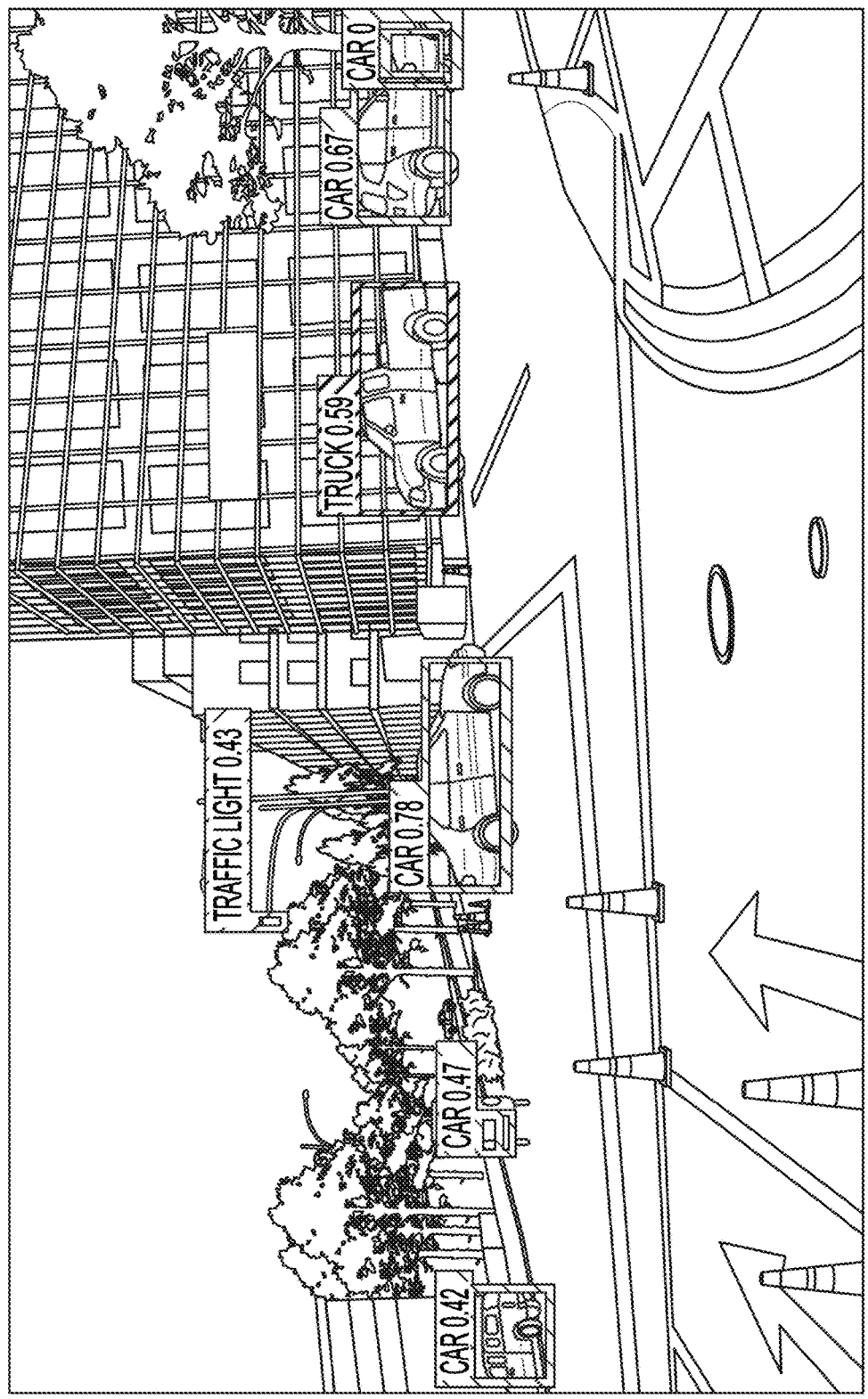
FIG. 9 is an example of an image with object detection results, in accordance with some examples.
Figure 10:
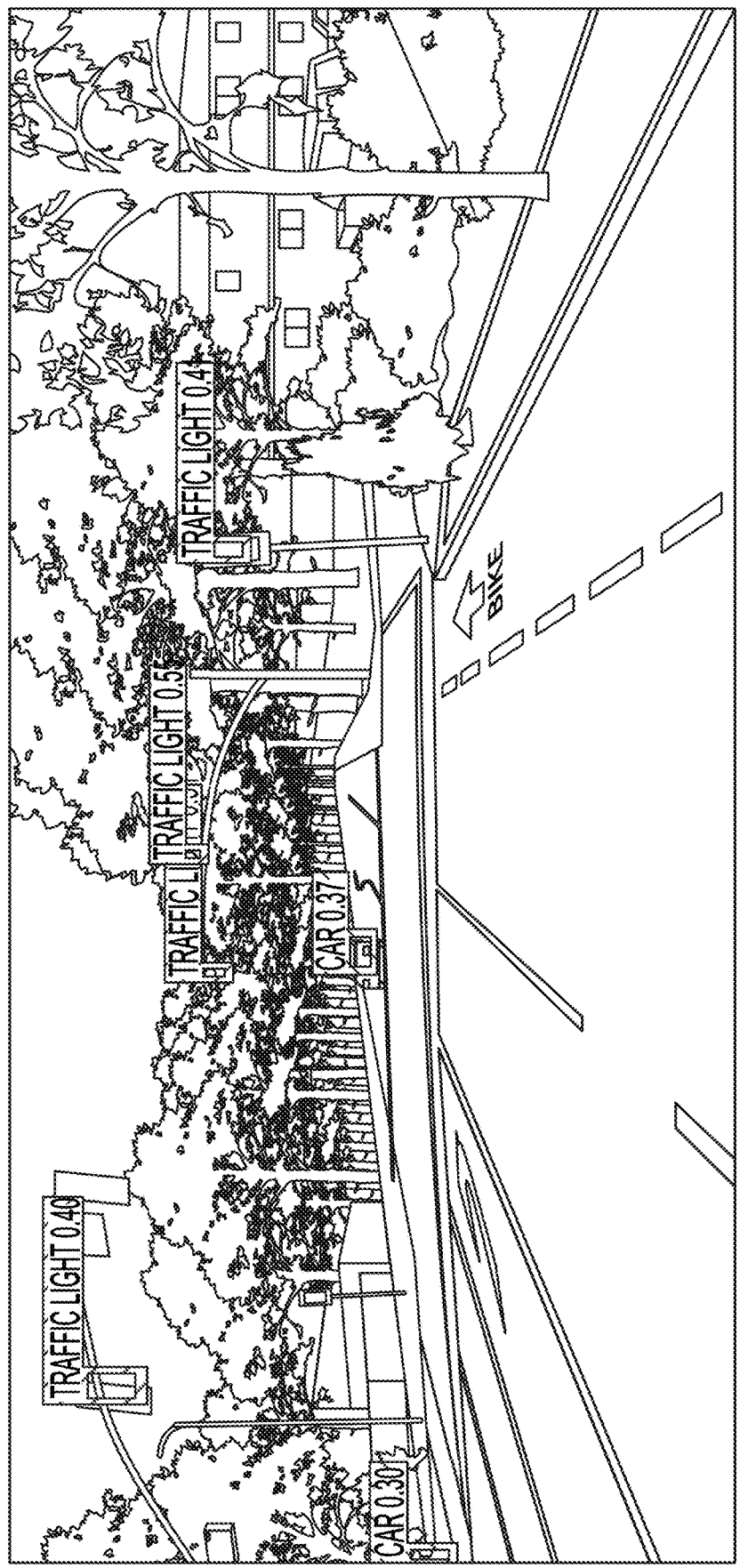
FIG. 10 is another example of an image with object detection results, in accordance with some examples.

Based on the object detection performed at block 808, the process 800 can render (at block 810A) an output frame with the bounding boxes, and in some cases a classification result. FIG. 9 illustrates one illustrative example of an output frame 900 with bounding boxes and classification results. The classification results include a several cars, a truck, and a traffic light. Also shown in FIG. 9 is a confidence score for each classification, indicating the probability or confidence that the object is what the classification suggests. FIG. 10 illustrates another example of an output frame 1000 with bounding boxes, classification results, and confidence scores.

For a subsequent frame of the sequence of frames, instead of performing object detection (e.g., generating a DNN-based inference) again, the motion-assisted object detection process can determine one or more motion characteristics of the current frame. For instance, the motion-assisted object detection process can compute motion vectors between the previous frame and the current frame. Subsequent frames (after the first frame 803A) are shown in FIG. 8 as a second frame 803B through an Nth frame 803N. For example, the process 800 can determine (at block 812) motion vectors between the first frame 803A and the second frame 803B, the process 800 can determine motion vectors between the second frame 803B and a third frame (not shown), the process 800 can determine (at block 822) motion vectors between an Nth frame 803N and the prior frame 803N-1, and so on. As described in more detail below, the determined motion between frames can be used to trigger performance of object detection for a next frame or used to modify or adjust pixels of the input frame.

As described above, in some cases, motion vectors can be computed using optical flow between frames (e.g., using an optical flow API). In some examples, optical flow maps can be generated based on the computation of the optical flow vectors between frames. The optical flow maps can include a vector for each pixel in a frame, where each vector indicates a movement of a pixel between the frames, or vectors for less than all pixels in the frames. For instance, a dense optical flow can be computed between adjacent frames to generate optical flow (OF) vectors for each pixel in a frame. The optical flow vectors can be included in a dense optical flow map. In another example, Lucas-Kanade optical flow can be computed between adjacent frames to generate OF vectors for certain pixels in a frame, which can be included in an optical flow map. Any other suitable type of optical flow technique or algorithm can be used to determine optical flow between frames. Each optical flow map can include a two-dimensional (2D) vector field, with each vector being a displacement vector showing the movement of points from a first frame to a second frame.

The optical flow maps can be computed between adjacent frames of the sequence of frames. Two adjacent frames can include two directly adjacent frames that are consecutively captured frames or two frames that are a certain distance apart (e.g., within two frames of one another, within three frames of one another, or other suitable distance) in a sequence of frames. In some implementations, the delta duration between the adjacent frames should be equal to or less than 33 ms in order to generate a good estimation for the adjusted input frame. For instance, for a frame sequence having a 30 fps frame rate, adjacent frames may need to be two directly adjacent frames that are approximately 33 ms apart from one another. The optical flow between adjacent frames can be computed in less than one frame time.

As noted above, the motion vectors (e.g., optical flow vectors from an optical flow map) can be used as a motion based trigger to determine when to run the object detection for a frame (e.g., in order to generate a DNN-based object detection inference). For example, if the motion vectors indicate change in movement between frames above a certain motion threshold, object detection can be performed for a next frame to generate bounding boxes (and in some cases classification results) for the next frame. Otherwise, if the motion vectors do not indicate a change above the motion threshold, the processed previous frame (the output frame) and the motion vectors between the previous and current frame can be used to generate the processed version of the current frame (e.g., the next output frame). For example, the optical flow vectors can be used to determine where the bounding boxes in the current frame should be located relative to the bounding boxes in the previous output frame.

Referring to FIG. 8, the process 800 can determine, at block 812, motion vectors between the second frame 803B and the first frame 803A. For example, the process 800 can perform an optical flow computation (as described above) for the second frame 803B to generate optical flow vectors between the second frame 803B and the first frame 803A. The process 800 can determine whether the amount of motion is greater than the motion threshold. The motion threshold can include any suitable amount of motion, such as a certain (x, y) movement (e.g., an (x, y) movement of (2, 2), indicating two pixels to the right or left, and two pixels upward or downward). The amount of motion can be determined based on a displacement of the motion vectors computed between the second frame 803B and the first frame 803A. In one illustrative example, a single representative displacement value can be determined based on a weighted displacement (of the motion vectors) for every single pixel in the frame. For instance, on a pixel by pixel basis, the difference in the motion of each pixel can be computed, and then the differences can be added together (and in some cases averaged). In some cases, the motion differences can be weighted based on the location of the pixels, and the weighted displacement values can be added together. In such an example, the representative displacement value can be compared to the motion threshold.

At block 814, if it is determined that the motion determined for the second frame 803B is greater than the motion threshold, the process 800 can, at block 818, perform object detection for the next frame of the video sequence (e.g., the frame immediately following the second frame 803B, two frames after the second frame 803B, three frames after the second frame 803B, or other frame following the second frame 803B). At block 810C, an output frame can then be rendered for the next frame using the object detection results from the object detection performed at block 818 on the second frame 803B. The output frame can have the bounding boxes and classification results generated by the object detection (e.g., as shown in FIG. 9 or FIG. 10). The next frame can include a third frame (not shown in FIG. 8), which can be a frame immediately after the second frame 803B in the sequence of frames or other frame following the second frame 803B. In some cases, the next frame can include a frame that is not immediately following the second frame 803B, such as two frames after the second frame 803B, three frames after the second frame 803B, or other frame following the second frame 803B.

The next frame can be processed using object detection instead of the current frame, in order to avoid both computing motion vectors and performing object detection (e.g., a deep neural network based CNN inference) for the same frame. Such a technique can reduce the risk of not finishing the motion vector and object detection in the time duration associated with a frame (e.g., 33 ms in a 30 fps video). For example, a high definition 1080p video can be run at approximately 24 to 30 fps on certain computing devices (e.g., on a smartphone), which results in approximately 33 ms per frame. In some cases, a compressed neural network model (e.g., Squeezenet, Mobilenet, or other model) can be run at approximately 12 ms, in which case the model can be run for a frame without any lag (e.g., the neural network processing can be completed within a single frame duration). Other frame processing may also be performed (e.g., decoding, object detection, among others), in which case there may not be time to perform motion vector computation. In some cases, in the event both object detection and motion vector determination can be performed in less than the time associated with one frame (e.g., 33 ms in a 30 fps frame rate video), the object detection can be performed for the current frame for which the motion is determined to be greater than the motion threshold.

Using such a technique, the motion can be used as a trigger to cause the object detection process to be performed for a next frame. For instance, it can be beneficial to perform object detection again when the motion is greater than the motion threshold, because the motion indicates that the position of the bounding boxes is going to change by a significant amount.

At block 814, if it is determined that the motion corresponding to the second frame 803B is not greater than (or is less than) the motion threshold, the process 800 can, at block 816, adjust bounding boxes of the second frame 803B using the motion vectors determined at block 812. For example, the motion vectors determined for the second frame 803B can be used to determine where the bounding boxes in the second frame 803B should be located relative to the bounding boxes in the previous output frame (generated at block 818). The bounding boxes can be moved using any suitable technique. For example, one or more representative points of a bounding box can be moved (e.g., the top-left corner point of the bounding box, the symmetrical center or centroid of the bounding box, or any other point). In another example, all tracked pixels in the bounding box can be moved. In another example, a circle from the symmetrical center of the bounding box describing the region of interest can be moved. The movement scheme can be a design parameter determined based on the particular use-case, based on one or more performance indicators (e.g., levels of performance, accuracy, power or any other performance indicators), based on the platform used to deploy the application, and/or any other factors. Using the optical flow vectors to determine the updated locations of the foreground and background pixels can eliminate the need to perform object detection for frames when motion is below the motion threshold.

The process 800 can render an output frame at block 810B based on the adjusted bounding box locations determined using the motion vectors. For example, the output frame can be rendered with the bounding boxes moved by the amount indicated by the motion vectors.

An Nth frame 803N can be obtained by the process 800, and the process 800 can determine (at block 822) motion vectors between a prior frame 803N-1 and the Nth frame 803N. The prior frame 803N-1 can include the frame immediately before the Nth frame 803N, or any previous frame (e.g., two frames prior to the Nth frame 803N, three frames prior to the Nth frame 803N, and so on). At block 822, the process 800 can determine motion vectors between the Nth frame 803N and the prior frame 803N-1. For example, the process 800 can perform an optical flow computation (as described above) for the Nth frame 803N to generate optical flow vectors between the Nth frame 803N and the prior frame 803N-1.

The process 800 can determine whether the amount of motion is greater than the motion threshold. As described above, the amount of motion can be determined based on a displacement of the motion vectors computed between the second frame 803B and the first frame 803A. At block 824, if it is determined that the motion determined for the Nth frame 803N is greater than the motion threshold, the process 800 can perform object detection at block 828 for the next frame of the video sequence (e.g., the frame immediately following the Nth frame 803N, two frames after the Nth frame 803N, three frames after the Nth frame 803N, or other frame following the Nth frame 803N).

At block 810N+1, an output frame can be rendered for the next frame after the Nth frame 803N. The output frame at block 810N+1 can be rendered using the object detection results from the object detection performed at block 828 on the Nth frame 803N. The output frame can be rendered with the bounding boxes and classification results generated by the object detection.

At block 824, if it is determined that the motion corresponding to the Nth frame 803N is not greater than (or is less than) the motion threshold, the process 800 can, at block 826, adjust the bounding boxes of the Nth frame 803N using the motion vectors determined at block 822. For example, the motion vectors determined for the prior frame 803N-1 can be used to determine where the bounding boxes in the Nth frame 803N should be located relative to the bounding boxes in the previous output frame. At block 810N, the process 800 can render an output frame based on the bounding box pixel locations determined at block 826 using the motion vectors.

The motion-assisted object detection process shown in FIG. 8 can continue to be performed for all frames of the sequence of frames. The motion-assisted object detection is a significant enhancement that saves the number of inferences that are run for a video sequence, thus improving latency, performance, and power. The number of times object detection is performed (e.g., the number of neural network inferences run) using the motion-assisted object detection is not pre-defined at regular intervals, like other solutions that are static in nature. Rather, the number of times object detection is performed is based on how much the image has changed (as determined by the motion or motion vector difference). Such a solution can drastically reduce the number of times object detection is performed, thus improving performance and power.

In some examples, as opposed to running the motion vector based detection on the entire image, motion vectors can be determined only for a subsection of a frame (e.g., the main area of interest within an image, such as a place where a user is typically present), and object detection can be performed if an appreciable change is detected in that subsection or in the bounding boxes of a specific object. Such examples may have a faster inference because the motion vector computations are performed on a smaller set of numbers. In some cases, users can turn the optical-flow based processing off and have object detection (e.g., neural network inferences) run on every single frame in certain situations, such as mission-critical use-cases. In some cases, user preference customizations can be provided while choosing which objects need to be given precedence.

As described above, neural network-based image segmentation can be used by the segmentation engine 104 to segment frames. As also described above, neural-network based object detection can also be performed. Any suitable neural network can be used to segment the frames and/or perform object detection for the frames. In some cases, the neural network can be a network designed to perform classification. Illustrative examples of deep neural networks that can be used include a convolutional neural network (CNN), an autoencoder, a deep belief net (DBN), a Recurrent Neural Networks (RNN), or any other suitable neural network. In one illustrative example, a MobileNet based neural network detector can be used by the segmentation engine. Other examples of deep network based detectors include a single-shot detector (SSD) (as described below with respect to FIG. 13A-FIG. 13C), a YOLO detector (as described below with respect to FIG. 14A-FIG. 14C), among other suitable detectors that operate using a complex neural network.

Figure 11:
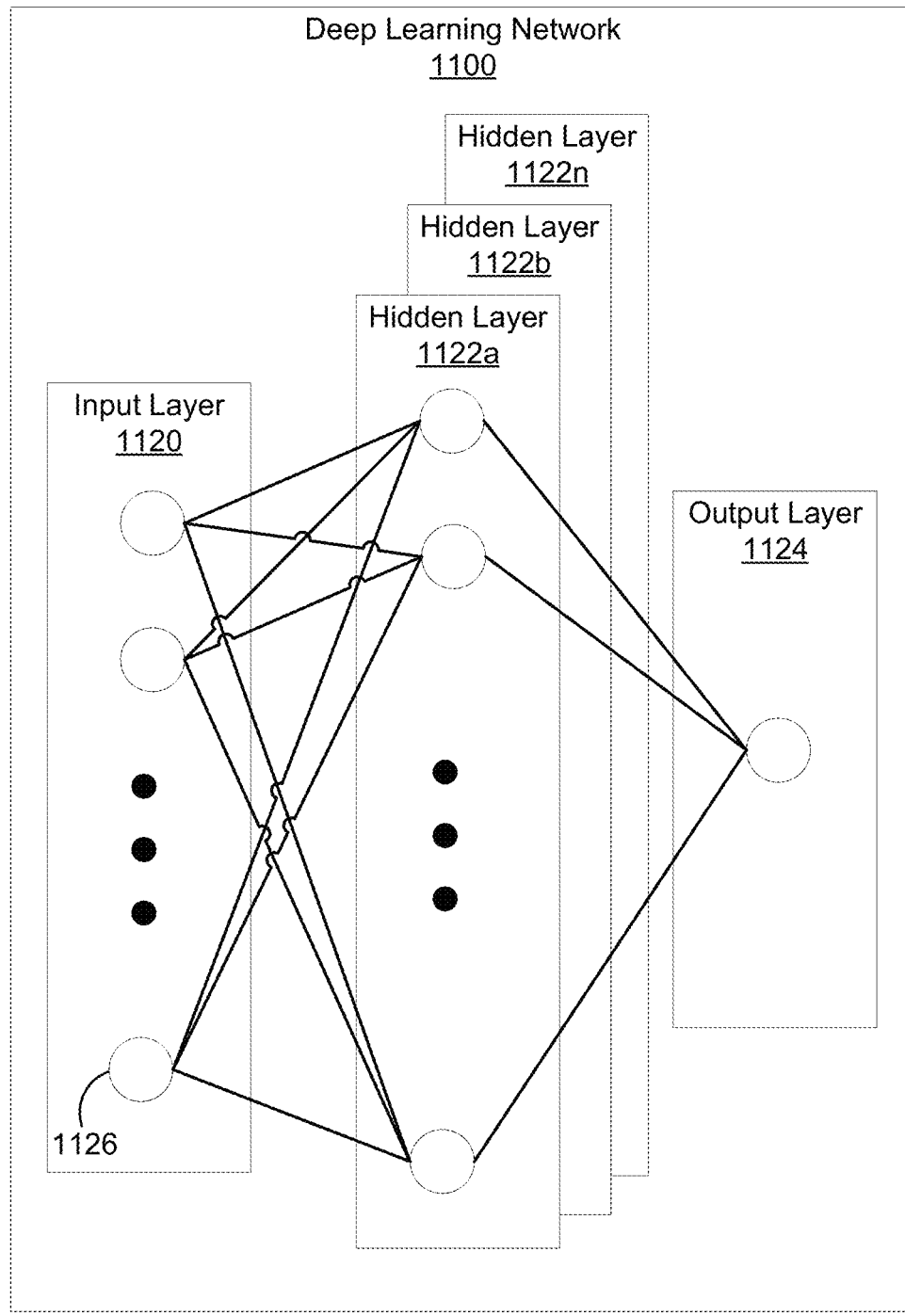
FIG. 11 is a block diagram illustrating an example of a deep learning network, in accordance with some examples.

FIG. 11 is an illustrative example of a deep learning neural network 1100 that can be used by the segmentation engine 104. An input layer 1120 includes input data. In one illustrative example, the input layer 1120 can include data representing the pixels of an input video frame. The deep learning neural network 1100 includes multiple hidden layers 1122a, 1122b, through 1122n. The hidden layers 1122a, 1122b, through 1122n include "n" number of hidden layers, where "n" is an integer greater than or equal to one. The number of hidden layers can be made to include as many layers as needed for the given application. The deep learning neural network 1100 further includes an output layer 1124 that provides an output resulting from the processing performed by the hidden layers 1122a, 1122b, through 1122n. In one illustrative example, the output layer 1124 can provide a classification and/or a localization for each object in an input video frame. The classification can include a class identifying the type of object (e.g., a person, a dog, a cat, or other object for which the network 1100 is trained to classify). When trained to localize an object, a localization provided by the network 1100 can include a bounding box indicating the location of an object.

The deep learning neural network 1100 is a multi-layer neural network of interconnected nodes. Each node can represent a piece of information. Information associated with the nodes is shared among the different layers and each layer retains information as information is processed. In some cases, the deep learning neural network 1100 can include a feed-forward network, in which case there are no feedback connections where outputs of the network are fed back into itself. In some cases, the network 1100 can include a recurrent neural network, which can have loops that allow information to be carried across nodes while reading in input.

Information can be exchanged between nodes through node-to-node interconnections between the various layers. Nodes of the input layer 1120 can activate a set of nodes in the first hidden layer 1122a. For example, as shown, each of the input nodes of the input layer 1120 is connected to each of the nodes of the first hidden layer 1122a. The nodes of the hidden layers 1122a-n can transform the information of each input node by applying activation functions to these information. The information derived from the transformation can then be passed to and can activate the nodes of the next hidden layer 1122b, which can perform their own designated functions. Example functions include convolutional, up-sampling, data transformation, and/or any other suitable functions. The output of the hidden layer 1122b can then activate nodes of the next hidden layer, and so on. The output of the last hidden layer 1122n can activate one or more nodes of the output layer 1124, at which an output is provided. In some cases, while nodes (e.g., node 1126) in the deep learning neural network 1100 are shown as having multiple output lines, a node has a single output and all lines shown as being output from a node represent the same output value.

In some cases, each node or interconnection between nodes can have a weight that is a set of parameters derived from the training of the deep learning neural network 1100. For example, an interconnection between nodes can represent a piece of information learned about the interconnected nodes. The interconnection can have a tunable numeric weight that can be tuned (e.g., based on a training dataset), allowing the deep learning neural network 1100 to be adaptive to inputs and able to learn as more and more data is processed.

The deep learning neural network 1100 is pre-trained to process the features from the data in the input layer 1120 using the different hidden layers 1122a, 1122b, through 1122n in order to provide the output through the output layer 1124. In an example in which the deep learning neural network 1100 is used to identify objects in images, the network 1100 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the deep learning neural network 1100 can adjust the weights of the nodes using a training process called backpropagation. Backpropagation can include a forward pass, a loss function, a backward pass, and a parameter (e.g., weight, bias, or other parameter) update. The forward pass, loss function, backward pass, and parameter update is performed for one training iteration. The process can be repeated for a certain number of iterations for each set of training images until the network 1100 is trained well enough so that the weights (and/or other parameters) of the layers are accurately tuned.

For the example of identifying objects in images, the forward pass can include passing a training image through the network 1100. The weights are initially randomized before the deep learning neural network 1100 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the network 1100, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the network 1100 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total} = \Sigma \frac{1}{2}(\text{target} - \text{output})^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The deep learning neural network 1100 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w=w_i-\eta dL/dW$, where w denotes a weight, $w_i$ denotes the initial weight, and $\eta$ denotes a learning rate. The learning rate can be set to any suitable value, with a high learning rate including larger weight updates and a lower value indicating smaller weight updates.

The deep learning neural network 1100 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The deep learning neural network 1100 can include any other deep network other than a CNN, such as an autoencoder, a deep belief nets (DBNs), a Recurrent Neural Networks (RNNs), among others.

Figure 12:
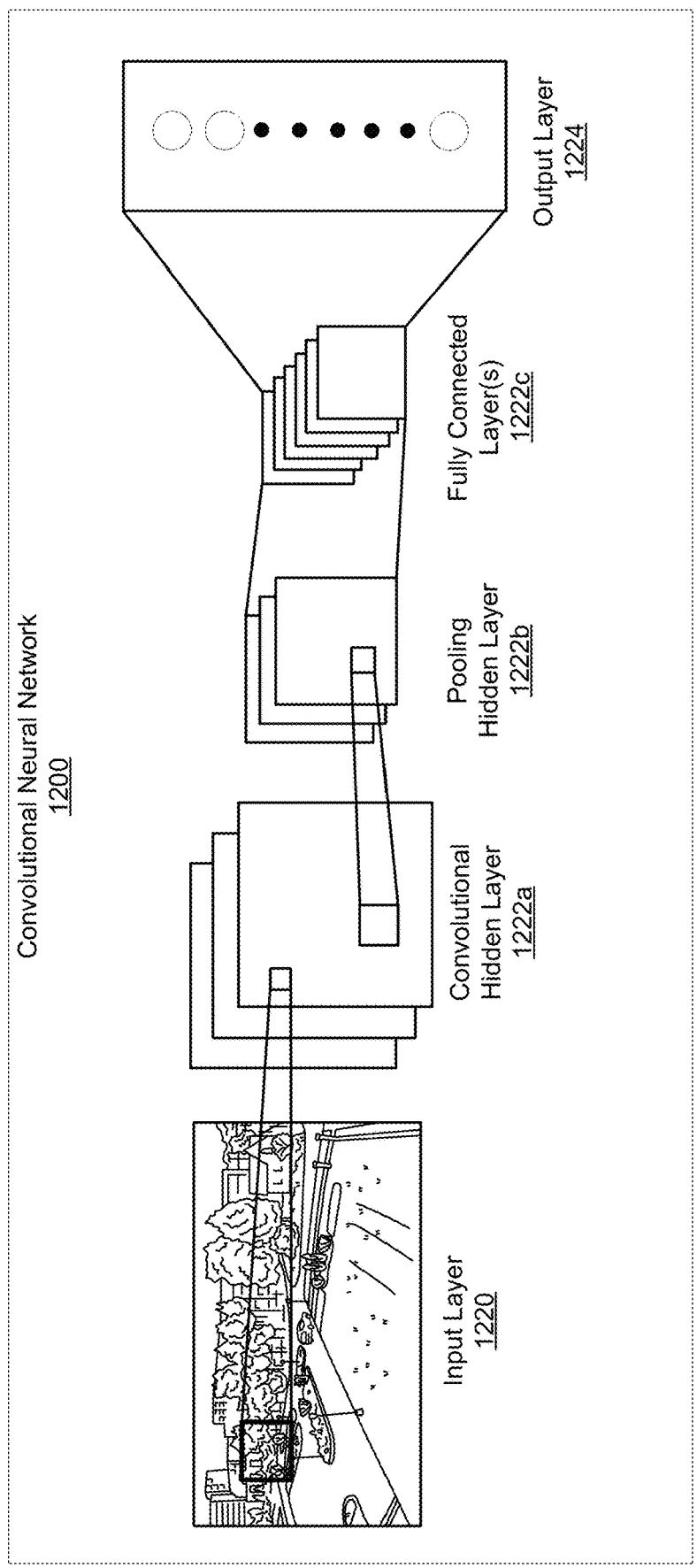
FIG. 12 is a block diagram illustrating an example of a convolutional neural network, in accordance with some examples.

FIG. 12 is an illustrative example of a convolutional neural network 1200 (CNN 1200). The input layer 1220 of the CNN 1200 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1222a, an optional non-linear activation layer, a pooling hidden layer 1222b, and fully connected hidden layers 1222c to get an output at the output layer 1224. While only one of each hidden layer is shown in FIG. 12, one of ordinary skill will appreciate that multiple convolutional hidden layers, non-linear layers, pooling hidden layers, and/or fully connected layers can be included in the CNN 1200. As previously described, the output can indicate a single class of an object or can include a probability of classes that best describe the object in the image. A class or probability of classes can be generated for each object in an image.

The first layer of the CNN 1200 is the convolutional hidden layer 1222a. The convolutional hidden layer 1222a analyzes the image data of the input layer 1220. Each node of the convolutional hidden layer 1222a is connected to a region of nodes (pixels) of the input image called a receptive field. The convolutional hidden layer 1222a can be considered as one or more filters (each filter corresponding to a different activation or feature map), with each convolutional iteration of a filter being a node or neuron of the convolutional hidden layer 1222a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1222a. Each connection between a node and a receptive field for that node learns a weight and, in some cases, an overall bias such that each node learns to analyze its particular local receptive field in the input image. Each node of the hidden layer 1222a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1222a is due to each node of the convolutional layer being applied to its corresponding receptive field. For example, a filter of the convolutional hidden layer 1222a can begin in the top-left corner of the input image array and can convolve around the input image. As noted above, each convolutional iteration of the filter can be considered a node or neuron of the convolutional hidden layer 1222a. At each convolutional iteration, the values of the filter are multiplied with a corresponding number of the original pixel values of the image (e.g., the 5×5 filter array is multipled by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1222a. For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1222a.

The mapping from the input layer to the convolutional hidden layer 1222a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 1222a can include several activation maps in order to identify multiple features in an image. The example shown in FIG. 12 includes three activation maps. Using three activation maps, the convolutional hidden layer 1222a can detect three different kinds of features, with each feature being detectable across the entire image.

In some examples, a non-linear hidden layer can be applied after the convolutional hidden layer 1222a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the network 1200 without affecting the receptive fields of the convolutional hidden layer 1222a.

The pooling hidden layer 1222b can be applied after the convolutional hidden layer 1222a (and after the non-linear hidden layer when used). The pooling hidden layer 1222b is used to simplify the information in the output from the convolutional hidden layer 1222a. For example, the pooling hidden layer 1222b can take each activation map output from the convolutional hidden layer 1222a and generates a condensed activation map (or feature map) using a pooling function. Max-pooling is one example of a function performed by a pooling hidden layer. Other forms of pooling functions be used by the pooling hidden layer 1222a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1222a. In the example shown in FIG. 12, three pooling filters are used for the three activation maps in the convolutional hidden layer 1222a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 1222a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1222a having a dimension of 24×24 nodes, the output from the pooling hidden layer 1222b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1200.

The final layer of connections in the network is a fully-connected layer that connects every node from the pooling hidden layer 1222b to every one of the output nodes in the output layer 1224. Using the example above, the input layer includes 28×28 nodes encoding the pixel intensities of the input image, the convolutional hidden layer 1222a includes 3×24×24 hidden feature nodes based on application of a 5×5 local receptive field (for the filters) to three activation maps, and the pooling layer 1222b includes a layer of 3×12×12 hidden feature nodes based on application of max-pooling filter to 2×2 regions across each of the three feature maps. Extending this example, the output layer 1224 can include ten output nodes. In such an example, every node of the 3×12×12 pooling hidden layer 1222b is connected to every node of the output layer 1224.

The fully connected layer 1222c can obtain the output of the previous pooling layer 1222b (which should represent the activation maps of high-level features) and determines the features that most correlate to a particular class. For example, the fully connected layer 1222c layer can determine the high-level features that most strongly correlate to a particular class, and can include weights (nodes) for the high-level features. A product can be computed between the weights of the fully connected layer 1222c and the pooling hidden layer 1222b to obtain probabilities for the different classes. For example, if the CNN 1200 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1224 can include an M-dimensional vector (in the prior example, M=10), where M can include the number of classes that the program has to choose from when classifying each object in the image. Other example outputs can also be provided. Each number in the N-dimensional vector can represent the probability an object is of a certain class. In one illustrative example, if a 10-dimensional output vector represents ten different classes of objects is [0 0 0.05 0.8 0 0.15 0 0 0 0], the vector indicates that there is a 5% probability that an object in the image is the third class of object (e.g., a dog), an 80% probability that the object in the image is the fourth class of object (e.g., a human), and a 15% probability that the object in the image is the sixth class of object (e.g., a kangaroo). The probability for a class can be considered a confidence level that the object is part of that class.

As previously noted, the segmentation engine 104 can use any suitable neural network. One example includes a MobileNet based classification network. MobileNet is an architecture that uses depthwise separable convolutions. For example, a normal convolution performed by some neural networks is replaced by the depthwise separable convolution. A depthwise separable convolution includes a depthwise convolution followed by a pointwise convolution. For example, assuming an input feature map has a dimension of Hi, Wi, Ci (height, width, input channel depth), Co feature maps are desired in the resulting feature map, and the convolution kernel size is K, then there are Ci convolution kernels (one for each input channel) with dimension K, K, 1. The resulting feature map has a dimension of Ho, Wo, Ci after the depthwise convolution. The depthwise convolution is followed by a pointwise convolution (e.g., a 1×1 convolution). The pointwise convolution kernel is of dimension 1, 1, Ci and there are Co different kernels, resulting in the feature map of Ho, Wo, Co dimension.

Using depthwise separable convolutions can significantly reduce the number of parameters that are used (as compared with a network that uses normal convolutions with the same depth in the networks), resulting in lightweight deep neural networks that can be beneficial in mobile and embedded based vision applications. Because the number of parameters is reduced, the number of floating point multiplication operations is also reduced, which is favorable in mobile and embedded vision applications that have less computing power than other devices.

Figure 13A:
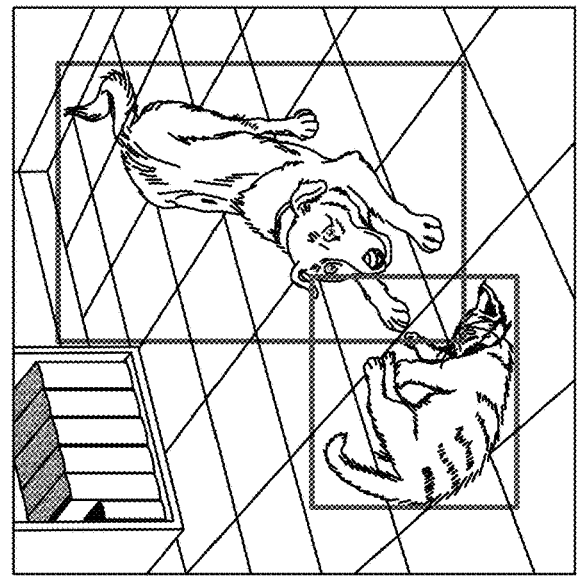
FIG. 13A-FIG. 13C are diagrams illustrating an example of a single-shot object detector, in accordance with some examples.
Figure 13B:
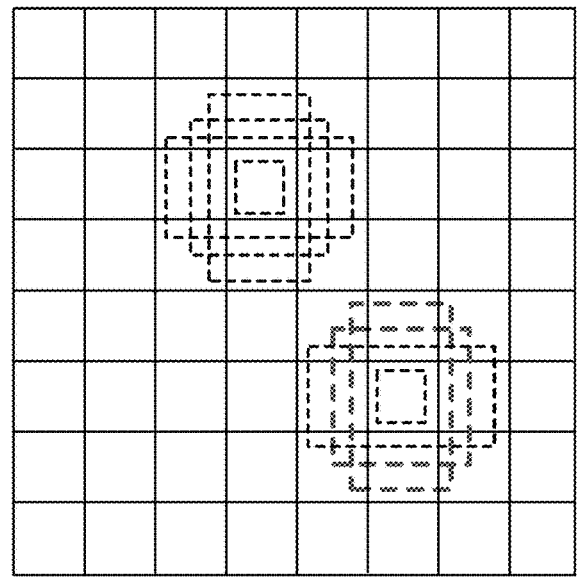
Figure 13C:
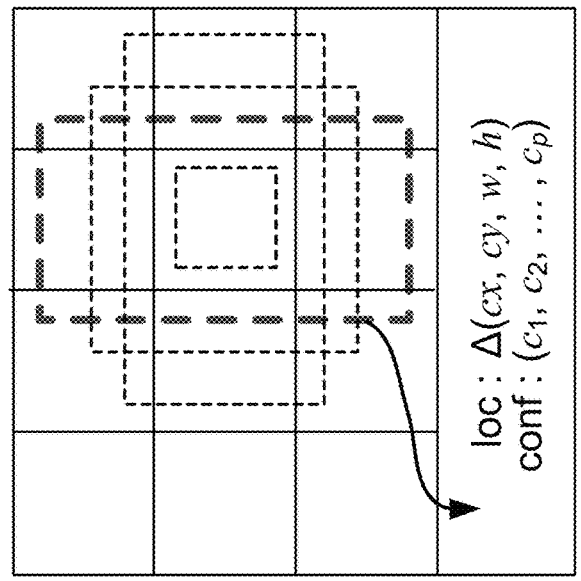

Another deep learning-based network that can be used by the segmentation engine 104 to segment frames includes the SSD detector, which is a fast single-shot object detector that can be applied for multiple object categories or classes. The SSD model uses multi-scale convolutional bounding box outputs attached to multiple feature maps at the top of the neural network. Such a representation allows the SSD to efficiently model diverse box shapes. FIG. 13A includes an image and FIG. 13B and FIG. 13C include diagrams illustrating how an SSD detector (with the VGG deep network base model) operates. For example, SSD matches objects with default boxes of different aspect ratios (shown as dashed rectangles in FIG. 13B and FIG. 13C). Each element of the feature map has a number of default boxes associated with it. Any default box with an intersection-over-union with a ground truth box over a threshold (e.g., 0.4, 0.5, 0.6, or other suitable threshold) is considered a match for the object. For example, two of the 8×8 boxes (shown in blue in FIG. 13B) are matched with the cat, and one of the 4×4 boxes (shown in red in FIG. 13C) is matched with the dog. SSD has multiple features maps, with each feature map being responsible for a different scale of objects, allowing it to identify objects across a large range of scales. For example, the boxes in the 8×8 feature map of FIG. 13B are smaller than the boxes in the 4×4 feature map of FIG. 13C. In one illustrative example, an SSD detector can have six feature maps in total.

For each default box in each cell, the SSD neural network outputs a probability vector of length c, where c is the number of classes, representing the probabilities of the box containing an object of each class. In some cases, a background class is included that indicates that there is no object in the box. The SSD network also outputs (for each default box in each cell) an offset vector with four entries containing the predicted offsets required to make the default box match the underlying object's bounding box. The vectors are given in the format (cx, cy, w, h), with cx indicating the center x, cy indicating the center y, w indicating the width offsets, and h indicating height offsets. The vectors are only meaningful if there actually is an object contained in the default box. For the image shown in FIG. 13A, all probability labels would indicate the background class with the exception of the three matched boxes (two for the cat, one for the dog).

Figure 14C:
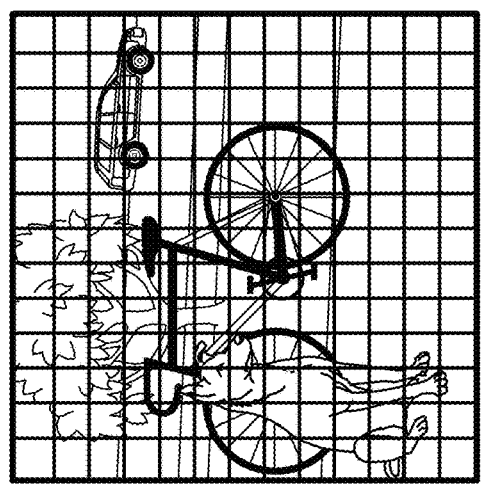
FIG. 14A-FIG. 14C are diagrams illustrating an example of a you only look once (YOLO) detector, in accordance with some examples.
Figure 14B:
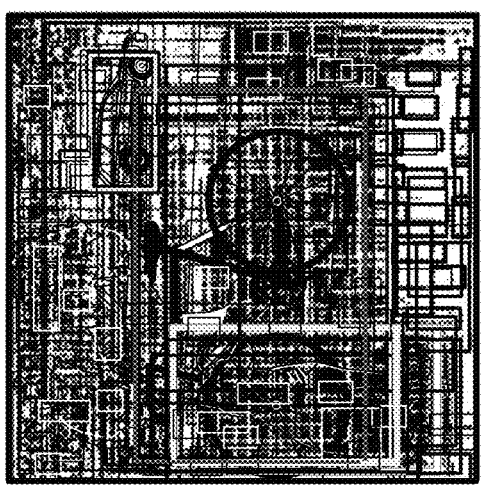
Figure 14A:
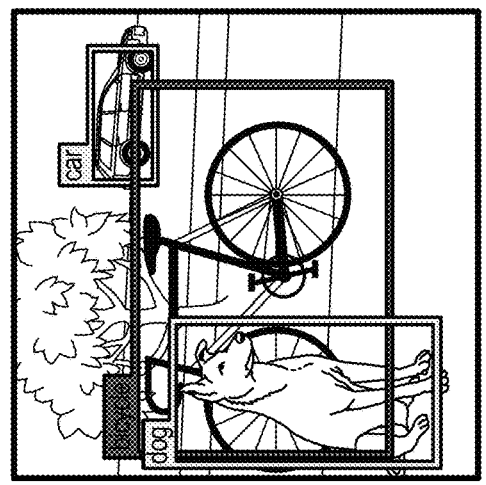

Another deep learning-based network that can be used by the segmentation engine 104 to segment frames includes the You only look once (YOLO) detector, which is an alternative to the SSD object detection system. FIG. 14A includes an image and FIG. 14B and FIG. 14C include diagrams illustrating how the YOLO detector operates. The YOLO detector can apply a single neural network to a full image. As shown, the YOLO network divides the image into regions and predicts bounding boxes and probabilities for each region. These bounding boxes are weighted by the predicted probabilities. For example, as shown in FIG. 14A, the YOLO detector divides up the image into a grid of 13-by-13 cells. Each of the cells is responsible for predicting five bounding boxes. A confidence score is provided that indicates how certain it is that the predicted bounding box actually encloses an object. This score does not include a classification of the object that might be in the box, but indicates if the shape of the box is suitable. The predicted bounding boxes are shown in FIG. 14B. The boxes with higher confidence scores have thicker borders.

Each cell also predicts a class for each bounding box. For example, a probability distribution over all the possible classes is provided. Any number of classes can be detected, such as a bicycle, a dog, a cat, a person, a car, or other suitable object class. The confidence score for a bounding box and the class prediction are combined into a final score that indicates the probability that that bounding box contains a specific type of object. For example, the box with thick borders on the left side of the image in FIG. 14B and FIG. 14C is 85% sure it contains the object class "dog." There are 169 grid cells (13×13) and each cell predicts 5 bounding boxes, resulting in 845 bounding boxes in total. Many of the bounding boxes will have very low scores, in which case only the boxes with a final score above a threshold (e.g., above a 30% probability, 40% probability, 50% probability, or other suitable threshold) are kept. FIG. 14C shows an image with the final predicted bounding boxes and classes, including a dog, a bicycle, and a car. As shown, from the 845 total bounding boxes that were generated, only the three bounding boxes shown in FIG. 14C were kept because they had the best final scores.

The image segmentation and/or object detection operations discussed herein may be implemented using compressed frames or using uncompressed frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example, the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of segmenting one or more frames, the method comprising:
   performing image segmentation on a first frame of a plurality of frames, the image segmentation resulting in generation of a segmentation mask;
   modifying pixels of at least one frame using the segmentation mask;
   determining movement of one or more pixels of a second frame relative to a previous frame;
   determining whether an amount of the movement of the one or more pixels of the second frame is above a motion threshold, the amount of movement being determined based on one or more motion characteristics of the second frame;
   in response to a determination that the amount of movement of the one or more pixels of the second frame is above the motion threshold, performing image segmentation on a third frame occurring in the plurality of frames after the second frame, the image segmentation being performed on the third frame based at least in part on an amount of time associated with both determining the movement of the one or more pixels of the second frame and performing image segmentation on the second frame exceeding a time duration associated with the second frame, wherein the image segmentation results in generation of an additional segmentation mask; and
   modifying pixels of the third frame using the additional segmentation mask.

2. The method of claim 1, wherein the second frame is a next frame after the first frame in the plurality of frames.

3. The method of claim 1, wherein the second frame is not a next frame after the first frame in the plurality of frames, and wherein the previous frame is an intervening frame between the first frame and the second frame.

4. The method of claim 1, wherein the one or more motion characteristics of the second frame include motion vectors between pixels of the previous frame and pixels of the second frame, the previous frame occurring in the plurality of frames prior to the second frame.

5. The method of claim 1, further comprising:
   obtaining a third frame of the plurality of frames;
   determining that the amount of movement of the one or more pixels of the third frame is below the motion threshold; and
   in response to determining that the amount of movement of the one or more pixels of the third frame is below the motion threshold, determining not to perform image segmentation using the third frame.

6. The method of claim 5, further comprising, in response to determining not to perform image segmentation using the third frame:
   determining movement of pixels of the third frame relative to pixels of a fourth frame; and
   determining locations of the pixels in the third frame based on the movement of the pixels of the third frame relative to the pixels of the fourth frame.

7. The method of claim 6, wherein the movement of the pixels of the third frame relative to the pixels of the fourth frame is determined using motion vectors determined between the pixels of the third frame and the pixels of the fourth frame.

8. The method of claim 7, wherein the locations of the pixels in the third frame are determined using the motion vectors.

9. The method of claim 1, wherein the image segmentation is performed using a neural network trained to segment foreground pixels of a frame from background pixels of the frame.

10. The method of claim 1, wherein the modified pixels of the first frame include background pixels of the first frame.

11. The method of claim 1, wherein the modified pixels of the first frame include foreground pixels of the first frame.

12. The method of claim 1, further comprising displaying an output frame, the output frame including the modified pixels of the third frame.

13. The method of claim 1, wherein the at least one frame includes the first frame.

14. An apparatus for segmenting one or more frames, comprising:
   a memory configured to store data corresponding to a plurality of frames; and
   a processor coupled to the memory and configured to:
      perform image segmentation on a first frame of the plurality of frames, the image segmentation resulting in generation of a segmentation mask;
      modify pixels of at least one frame using the segmentation mask;

determine movement of one or more pixels of a second frame relative to a previous frame;

determine whether an amount of the movement of the one or more pixels of the second frame is above a motion threshold, the amount of movement being determined based on one or more motion characteristics of the second frame;

in response to a determination that the amount of movement of the one or more pixels of the second frame is above the motion threshold, perform image segmentation on a third frame occurring in the plurality of frames after the second frame, the image segmentation being performed on the third frame based at least in part on an amount of time associated with both determining the movement of the one or more pixels of the second frame and performing image segmentation on the second frame exceeding a time duration associated with the second frame, wherein the image segmentation results in generation of an additional segmentation mask; and modify pixels of the third frame using the additional segmentation mask.

15. The apparatus of claim 14, wherein the second frame is a next frame after the first frame in the plurality of frames.

16. The apparatus of claim 14, wherein the second frame is not a next frame after the first frame in the plurality of frames, and wherein the previous frame is an intervening frame between the first frame and the second frame.

17. The apparatus of claim 14, wherein the one or more motion characteristics of the second frame include motion vectors between pixels of the previous frame and pixels of the second frame, the previous frame occurring in the plurality of frames prior to the second frame.

18. The apparatus of claim 14, wherein the processor is further configured to:

obtain a third frame of the plurality of frames;

determine an amount of movement of one or more pixels of the third frame relative to a fourth frame, the fourth frame occurring in the plurality of frames prior to the third frame;

determine that the amount of movement of the one or more pixels of the third frame is below the motion threshold; and in response to determining that the amount of movement of the one or more pixels of the third frame is below the motion threshold, determine not to perform image segmentation using the third frame.

19. The apparatus of claim 18, wherein the processor is further configured to, in response to determining not to perform image segmentation using the third frame:

determine movement of pixels of the third frame relative to pixels of the fourth frame; and determine locations of the pixels in the third frame based on the movement of the pixels of the third frame relative to the pixels of the fourth frame.

20. The apparatus of claim 19, wherein the movement of the pixels of the third frame relative to the pixels of the fourth frame is determined using motion vectors determined between the pixels of the third frame and the pixels of the fourth frame.

21. The apparatus of claim 20, wherein the locations of the pixels in the third frame are determined using the motion vectors.

22. The apparatus of claim 14, wherein the image segmentation is performed using a neural network trained to segment foreground pixels of a frame from background pixels of the frame.

23. The apparatus of claim 14, wherein the modified pixels of the first frame include background pixels of the first frame.

24. The apparatus of claim 14, wherein the modified pixels of the first frame include foreground pixels of the first frame.

25. The apparatus of claim 14, further comprising one or more cameras for capturing the plurality of frames.

26. The apparatus of claim 14, further comprising a display for displaying an output frame, the output frame including the modified pixels of the third frame.

27. The apparatus of claim 14, wherein the at least one frame includes the first frame.

28. A non-transitory computer-readable medium having stored thereon instructions that, when executed by one or more processors, cause the one or more processors to:

perform image segmentation on a first frame of a plurality of frames, the image segmentation resulting in generation of a segmentation mask;

modify pixels of at least one frame using the segmentation mask;

determine movement of one or more pixels of a second frame relative to a previous frame;

determine whether an amount of the movement of the one or more pixels of the second frame is above a motion threshold, the amount of movement being determined based on one or more motion characteristics of the second frame;

in response to a determination that the amount of movement of the one or more pixels of the second frame is above the motion threshold, perform image segmentation on a third frame occurring in the plurality of frames after the second frame, the image segmentation being performed on the third frame based at least in part on an amount of time associated with both determining the movement of the one or more pixels of the second frame and performing image segmentation on the second frame exceeding a time duration associated with the second frame, wherein the image segmentation results in generation of an additional segmentation mask; and modify pixels of the third frame using the additional segmentation mask.

* * * * *